US008958837B2

(12) United States Patent
Shuman et al.

(10) Patent No.: US 8,958,837 B2
(45) Date of Patent: *Feb. 17, 2015

(54) REDUCING TIME FOR CALL FAILURE INDICATION

(71) Applicant: QUALCOMM Incorporated, San Diego, CA (US)

(72) Inventors: Mohammed Ataur Rahman Shuman, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,615

(22) Filed: May 1, 2014

(65) Prior Publication Data

US 2014/0242978 A1 Aug. 28, 2014

Related U.S. Application Data

(63) Continuation-in-part of application No. 12/751,624, filed on Mar. 31, 2010, now Pat. No. 8,744,509.

(60) Provisional application No. 61/167,697, filed on Apr. 8, 2009.

(51) Int. Cl.
*H04W 24/00* (2009.01)
*H04W 76/02* (2009.01)
(Continued)

(52) U.S. Cl.
CPC .......... *H04W 76/027* (2013.01); *H04W 76/00* (2013.01); *H04W 4/10* (2013.01); *H04W 76/005* (2013.01)

USPC .................... 455/518; 455/517; 455/519

(58) Field of Classification Search
USPC ................................. 455/517–519
See application file for complete search history.

(56) References Cited

U.S. PATENT DOCUMENTS 7,221,670 B2 * 5/2007 Sayeedi et al. ............. 370/342
7,830,812 B2 * 11/2010 Atkins et al. ............... 370/252
(Continued)

FOREIGN PATENT DOCUMENTS

CN 101077031 A 11/2007
JP 2005354692 A 12/2005
(Continued)

OTHER PUBLICATIONS

International Preliminary Report on Patentability—PCT/US2010/030184, The International Bureau of WIPO—Geneva, Switzerland, Jul. 6, 2011.

(Continued)

*Primary Examiner* — Bobbak Safaipour
(74) *Attorney, Agent, or Firm* — Raphael Freiwirth

(57) ABSTRACT

Methods and apparatuses for reducing time to receive a call failure indication in a wireless communications system are provided. A request to initiate a call with a target user equipment (UE) is received from an originating UE. A call setup message that corresponds to the request is sent to a network node, and an internet control message protocol (ICMP) message indicative of the network node lacking a dedicated bearer to a radio access network that corresponds to the target UE can be received in response to the request. Based on the ICMP message, a status failure message is sent to the originating UE indicating failure of the call.

30 Claims, 18 Drawing Sheets

(51) Int. Cl.
*H04W 76/00* (2009.01)
*H04W 4/10* (2009.01)

(56) References Cited

U.S. PATENT DOCUMENTS

| | | | |
|---|---|---|---|
| 8,045,515 B2* | 10/2011 | Nookala et al. | 370/329 |
| 8,170,491 B2* | 5/2012 | Shuman et al. | 455/67.11 |
| 8,195,213 B2* | 6/2012 | Maggenti et al. | 455/518 |
| 8,346,211 B2* | 1/2013 | Shuman et al. | 455/406 |
| 8,447,324 B2* | 5/2013 | Shuman et al. | 455/456.1 |
| 8,520,613 B2* | 8/2013 | Maggenti et al. | 370/329 |
| 8,577,404 B2* | 11/2013 | Brewer et al. | 455/518 |
| 8,744,509 B2* | 6/2014 | Shuman et al. | 455/518 |
| 2003/0031159 A1* | 2/2003 | Sayeedi et al. | 370/342 |
| 2005/0063329 A1* | 3/2005 | Lee et al. | 370/328 |
| 2005/0124367 A1 | 6/2005 | Hassan et al. | |
| 2005/0272454 A1* | 12/2005 | Hiller et al. | 455/518 |
| 2007/0153676 A1* | 7/2007 | Baglin et al. | 370/216 |
| 2007/0153750 A1* | 7/2007 | Baglin et al. | 370/338 |
| 2007/0153751 A1* | 7/2007 | Svensson et al. | 370/338 |
| 2008/0004035 A1* | 1/2008 | Atkins et al. | 455/454 |
| 2008/0153480 A1 | 6/2008 | Jiang | |
| 2008/0159240 A1 | 7/2008 | Hamilton | |
| 2009/0073933 A1* | 3/2009 | Madour et al. | 370/331 |
| 2009/0207808 A1* | 8/2009 | McCann et al. | 370/331 |
| 2009/0207821 A1* | 8/2009 | Rune | 370/338 |
| 2009/0271656 A1* | 10/2009 | Yokota et al. | 714/6 |
| 2010/0056109 A1* | 3/2010 | Wilson et al. | 455/412.1 |
| 2010/0215052 A1* | 8/2010 | Liu et al. | 370/463 |
| 2010/0235890 A1* | 9/2010 | Cakulev et al. | 726/5 |

FOREIGN PATENT DOCUMENTS

| | | |
|---|---|---|
| JP | 2007515884 A | 6/2007 |
| WO | 2007149025 A1 | 12/2007 |

OTHER PUBLICATIONS

International Search Report and Written Opinion—PCT/US2010/030184, International Search Authority—European Patent Office—Jul. 6, 2010.

* cited by examiner

REDUCING TIME FOR CALL FAILURE INDICATION

CLAIM OF PRIORITY UNDER 35 U.S.C. §119

The present application for patent is a continuation-in-part of application Ser. No. 12/751,624 entitled "REDUCING TIME FOR CALL FAILURE INDICATION" filed Mar. 31, 2010, which claims priority to Provisional Application No. 61/167,697 entitled "REDUCING TIME FOR CALL FAILURE INDICATION WHERE TARGET DEVICE IS UNREACHABLE BUT STILL REGISTERED WITH THE ALL SERVER" filed Apr. 8, 2009, both of which are assigned to the assignee hereof and hereby expressly incorporated by reference herein.

BACKGROUND OF THE INVENTION

Aspects of the disclosure relate to measuring the performance of call completion in wireless communications systems.

In wireless telecommunication devices, such as cellular phones, PDAs, mini-laptops, and advanced pagers, the devices typically communicate over long distances by bridging telephone calls through existing cellular telephone networks and passing data packets across the network. These wireless devices have varying data processing and computing capability, and can accordingly send and receive software programs, in addition to voice, across the wireless network.

One wireless telecommunication service provides a quick one-to-one or one-to-many communication that is generically referred to as "Push to talk over cellular" ("PTT PoC," "push to talk," "PTT") capability. The specific PTT group of recipient devices for the communicating wireless device is commonly set up by the carrier. A PTT communication connection is typically initiated by a single button-push on the wireless device that activates a half-duplex link between the speaker and each member device of the group so that the wireless device can speak on the "floor" and once the button is released, the floor is released and the wireless device can receive incoming PTT transmissions. In some arrangements, the PTT speaker will have the "floor" where no other group member can speak while the speaker is speaking. Once the speaker releases the PTT button, any other individual member of the group can engage their PTT button and they will have the floor.

In a PTT environment, when the PTT server sends an ANNOUNCE message to a target client, the packet data serving node ("PDSN") receives the ANNOUNCE message and needs to route that message to the target client's wireless communication device. In order to route the ANNOUNCE message to the appropriate radio access network ("RAN"), the PDSN must have an established A10 connection with the RAN. It is possible that the PDSN receives the ANNOUNCE message for a target device without having an established A10 connection with the RAN. This can occur because, due to an internal problem at either the RAN or PDSN, an A10 or point-to-point protocol ("PPP") connection between the RAN and PDSN is not present for the target client device. In current systems, the PDSN will drop the announce message, the PTT server will time out, and will keep resending the ANNOUNCE message according to a preset reliability mechanism. After the reliability mechanism has completed, the server will end the call and send a STATUS failure message to the operator indicating that the target device cannot be reached. There may be several issues associated with this design.

First, the current system may waste server resources to retry the ANNOUNCE message. Second, it may waste over-the-air bandwidth resources for the originating wireless communication device, because the server does not send the STATUS failure before it exhausts the reliability mechanism. Third, in current systems, one cannot infer whether the message reached the target RAN or not from the cause code of the STATUS failure or from the server log. Fourth, during field testing activity when the only logs available are client logs, it is very important to know the exact failure code for the failed call attempt. A generic failed reason of "target unreachable" does not help identify the root cause of the problem.

Similar issues may occur in other wireless communications systems that utilize multiple bearers for communications between a device and network having an evolved packet core (EPC). In such systems, an application server providing voice services can send a call setup message to a serving node in the EPC to establish a call from an originating device to a target device. Though the EPC may have a default bearer to the target device, it may not have a bearer capable of providing a quality of service (QoS) for the voice services. Thus, the EPC may attempt to setup the call over a bearer that does not meet QoS requirements for the call. In other cases, the EPC may drop the call setup message due to lack of a dedicated bearer, which may cause the application server to timeout and repeatedly resend the call setup request. Moreover, in some examples, such as in voice over long term evolution (VoLTE), upon receiving a call setup failure, the originating wireless communication device may fall back to a circuit switch voice call technology (e.g., code division multiple access (CDMA), global system for mobile communications (GSM), etc.).

As such, it would be beneficial to have techniques that increase the speed and minimize the resources involved with communicating a call failure message to an originating wireless communications device.

SUMMARY

In an embodiment, a network communications entity may receive from an originator wireless communications device a request to initiate a call with a target wireless communications device. The network entity may send a call announce message that corresponds to the request to a network node. The network entity may receive from the network node an internet control message protocol (ICMP) message indicative of the node lacking one of a plurality of connections (e.g., one of a plurality of bearers) to a radio access network that corresponds to the target. The network entity may send a status failure message to the originator indicative of the call failing. The network communications entity may include a group communication server, a Push-To-Talk (PTT) server, and/or a call server.

According to an example, a method for reducing time to receive a call failure indication in a wireless communications system is provided. The method includes receiving, from an originating user equipment (UE), a request to initiate a call with a target UE, and sending a call setup message that corresponds to the request to a network node. The method further includes receiving, from the network node, an ICMP message indicative of the network node lacking a dedicated bearer to a radio access network that corresponds to the target UE, and sending, based on the ICMP message a status failure message to the originating UE indicative of the call failing.

In another example, an apparatus for reducing time to receive a call failure indication in a wireless communications system is provided. The apparatus includes a call request receiving component operable for receiving, from an originating UE, a request to initiate a call with a target UE. The apparatus also includes a call setup messaging component operable for sending a call setup message that corresponds to the request to a network node, and receiving, from the network node, an ICMP message indicative of the network node lacking a dedicated bearer to a radio access network that corresponds to the target UE. The apparatus further includes a call setup component operable for sending, based on the ICMP message, a status failure message to the originating UE indicative of the call failing.

In a further example, an apparatus for reducing time to receive a call failure indication in a wireless communications system is provided. The apparatus includes means for receiving, from an originating UE, a request to initiate a call with a target UE. The apparatus also include means for sending a call setup message that corresponds to the request to a network node, and receiving, from the network node, an ICMP message indicative of the network node lacking a dedicated bearer to a radio access network that corresponds to the target UE. The apparatus additionally includes means for sending, based on the ICMP message, a status failure message to the originating UE indicative of the call failing.

In yet another example, a computer program product, stored on a non-transitory computer readable medium, for reducing time to receive a call failure indication in a wireless communications system. The computer program product includes code for causing at least one computer to receive, from an originating UE, a request to initiate a call with a target UE, send a call setup message that corresponds to the request to a network node, receive, from the network node, an ICMP message indicative of the network node lacking a dedicated bearer to a radio access network that corresponds to the target UE, and send, based on the ICMP message a status failure message to the originating UE indicative of the call failing.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
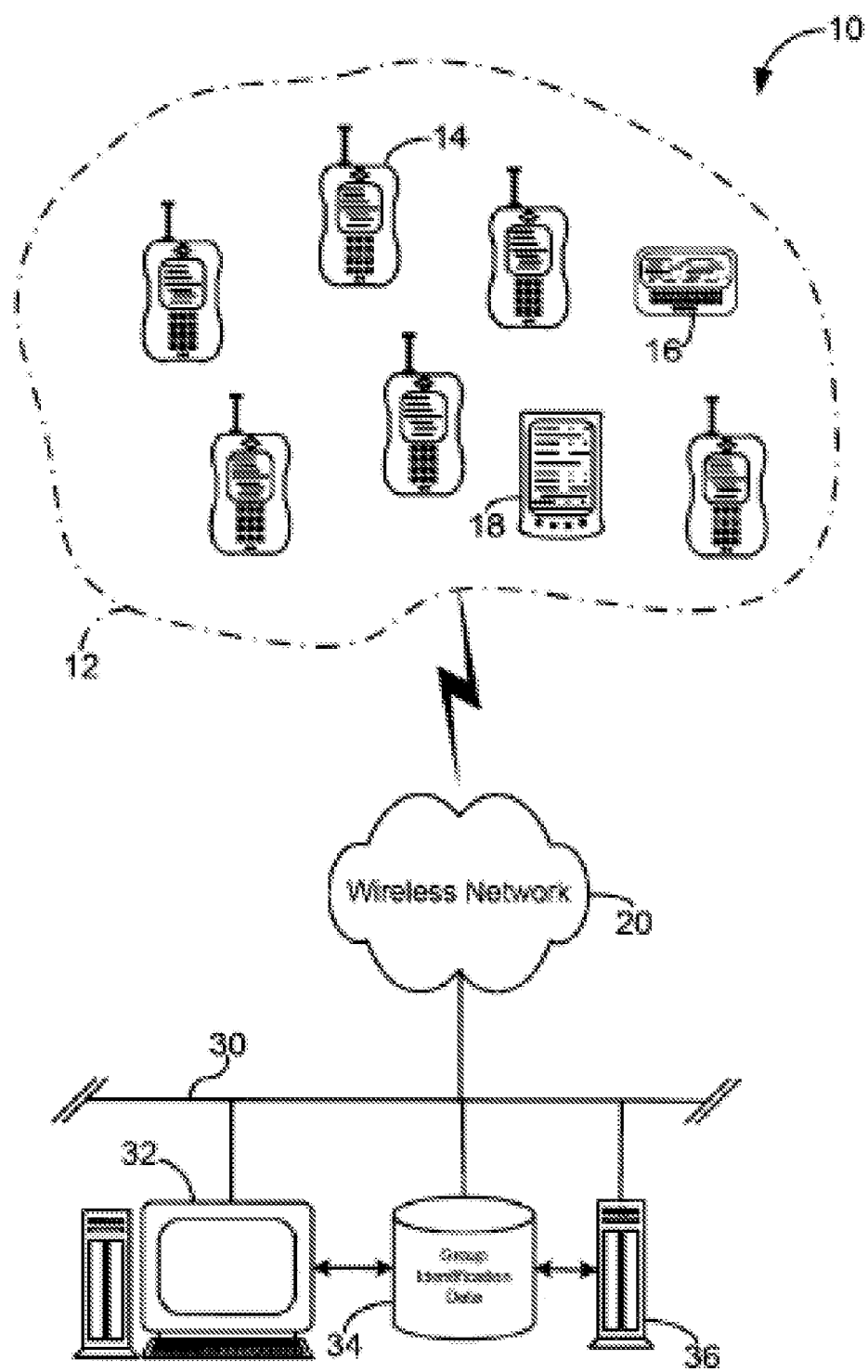
FIG. 1 is a representative diagram of a wireless network with a designated PTT group of wireless telecommunication devices communicating with a group communication server and other computer devices across the wireless network.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

In this description, the terms "communication device," "wireless device," "wireless communications device," "PTT communication device," "handheld device," "mobile device," "user equipment (UE)," and "handset" are used interchangeably. The terms "call" and "communication" are also used interchangeably. The term "application" as used herein is intended to encompass executable and non-executable software files, raw data, aggregated data, patches, and other code segments. The terms "group communication" or "PTT call" mean a point-to-point or point-to-multipoint half-duplex communication, either in a true or virtual half-duplex communication channel.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) notifies at least the group communication computer device, shown here as server 32, which may be present on a server-side LAN 30 across the wireless network 20, to indicate that the wireless device is present, i.e. accessible, on the wireless network 20. The group communication computer device 32 can share this information with the set of target wireless telecommunication devices designated by the wireless telecommunication device, or can also share is with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14, 16, 18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein In overview, the system 10 includes at least one wireless communication device, such as mobile telephone 14, that is a member of a communication group 12 of wireless communication devices that communicate with each other in group communications across a wireless communication network 20. The wireless communication device can also be configured to selectively send group-directed media to other members of the communication group 12, such as voice or other data. At least one group communication computer device 32 may be configured to store information on communication groups 12 on the wireless communication network 20, the information including the identity of the specific member wireless communication devices of one or more communication groups. The group communication computer device 32 may be further configured to selectively receive group-directed media from a sending wireless communication device, such as mobile telephone 14, of a communication group 12 and send the group-directed media to the other member wireless communication devices of the communication group 12 for the sending wireless communication device. The system 10 can further include a data store 36 in communication with the group communication server(s) 32, for access and storage purposes.

The wireless communication device 14, 16, 18 can send communication group identification data to the group communication computer device 32 at the time of requesting the group-directed media to be sent, e.g. send a target list, and thus, the group communication device 32 may send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the group communication computer device 32, and the group communication computer device 32 can send one or more addresses or communication group addresses to the wireless communication device 14,16, 18.

Figure 2:
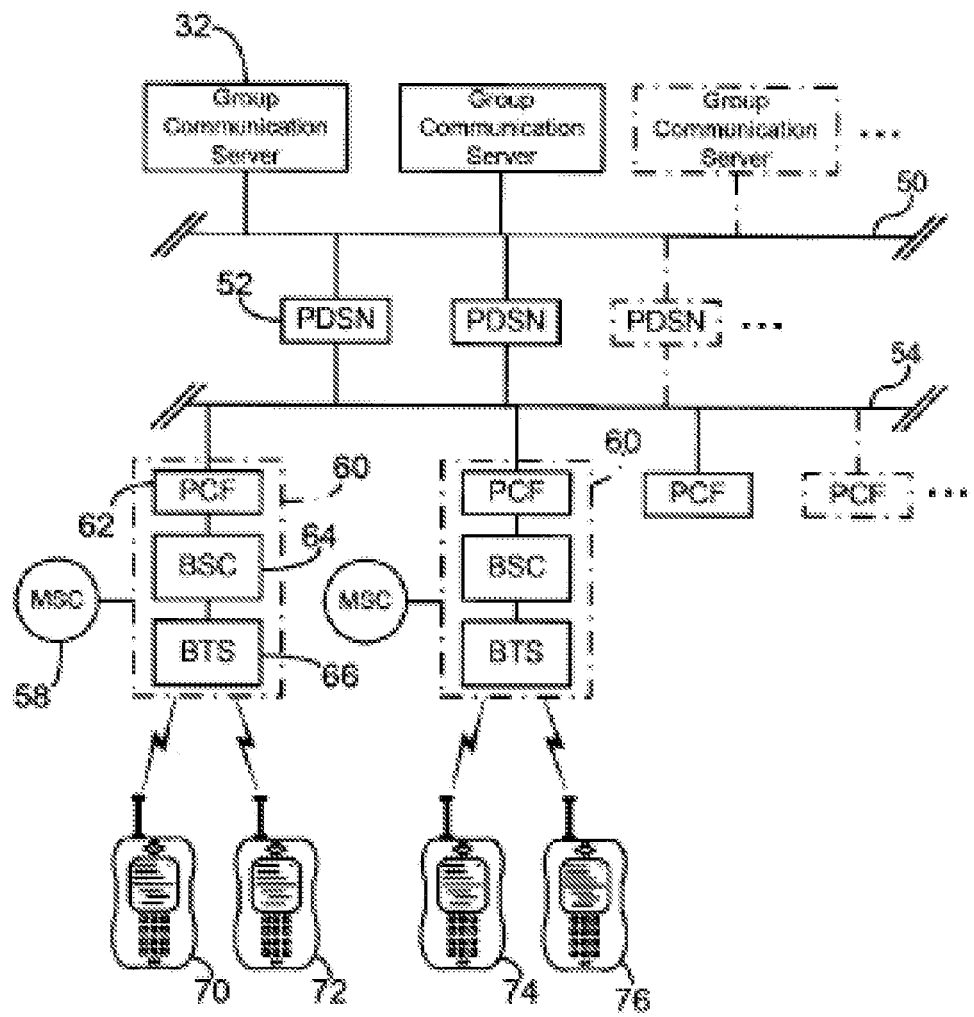
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 may be connected to a group communication server LAN 50. Wireless telephones can request packet data sessions from the group communication server(s) 32 using a data service option.

The group communication server(s) 32 are connected to a wireless service provider's packet data service node (PDSN) such as PDSN 52, shown here resident on a carrier network

54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
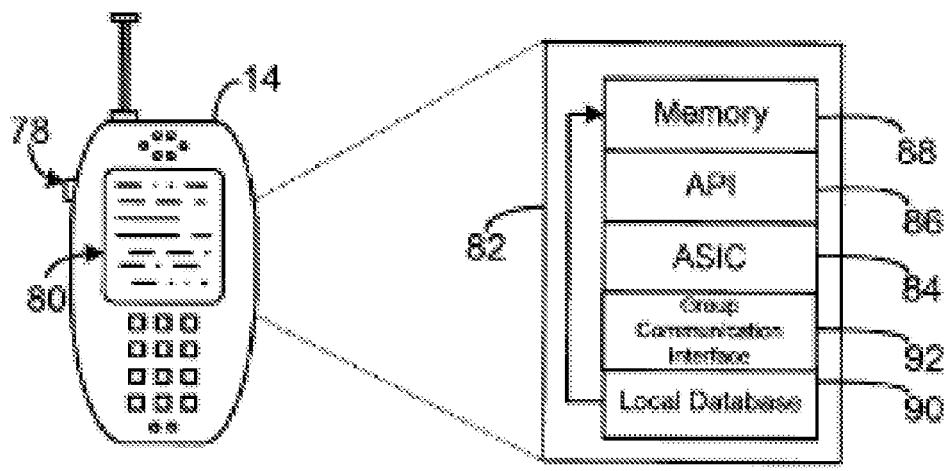
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a group communication interface 92 that can open the group communication channel from the wireless device. The group communication interface 92 can also be part of the standard communication interface for the wireless device which ordinarily carries the voice and data transmitted to and from the wireless device. The group communication interface 92 typically is comprised of hardware as is known in the art.

Figure 4:
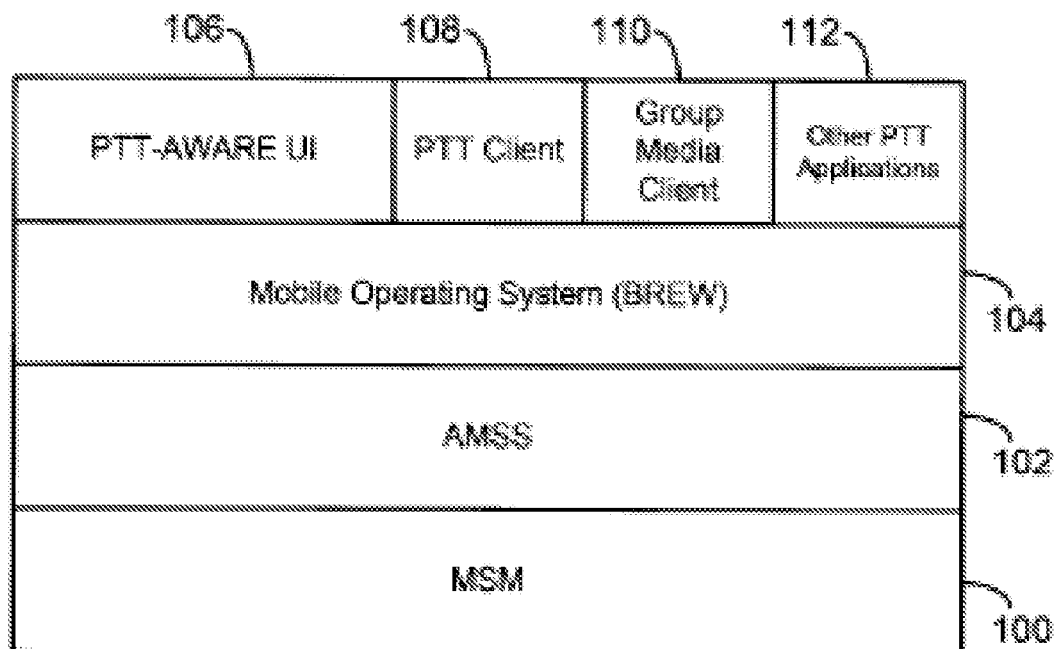
FIG. 4 is a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 1x and CDMA2000 1xEV-DO. There is a mobile operating system layer 104. The mobile operating system layer 104 application programming interfaces for chip- or device-specific operations, while providing an isolation layer that eliminates direct contact to the AMSS 102 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user the result of any group-directed media request. The user can also have setting on the Group Media Client 110, that specify how to handle an incoming notification that indicates there is a file to be downloaded from the file management server (data store 36). For example, the Group Media Client 110 can elect to have the file download commence immediately or to allow the target user to be prompted to determine whether to download the file.

Figure 5:
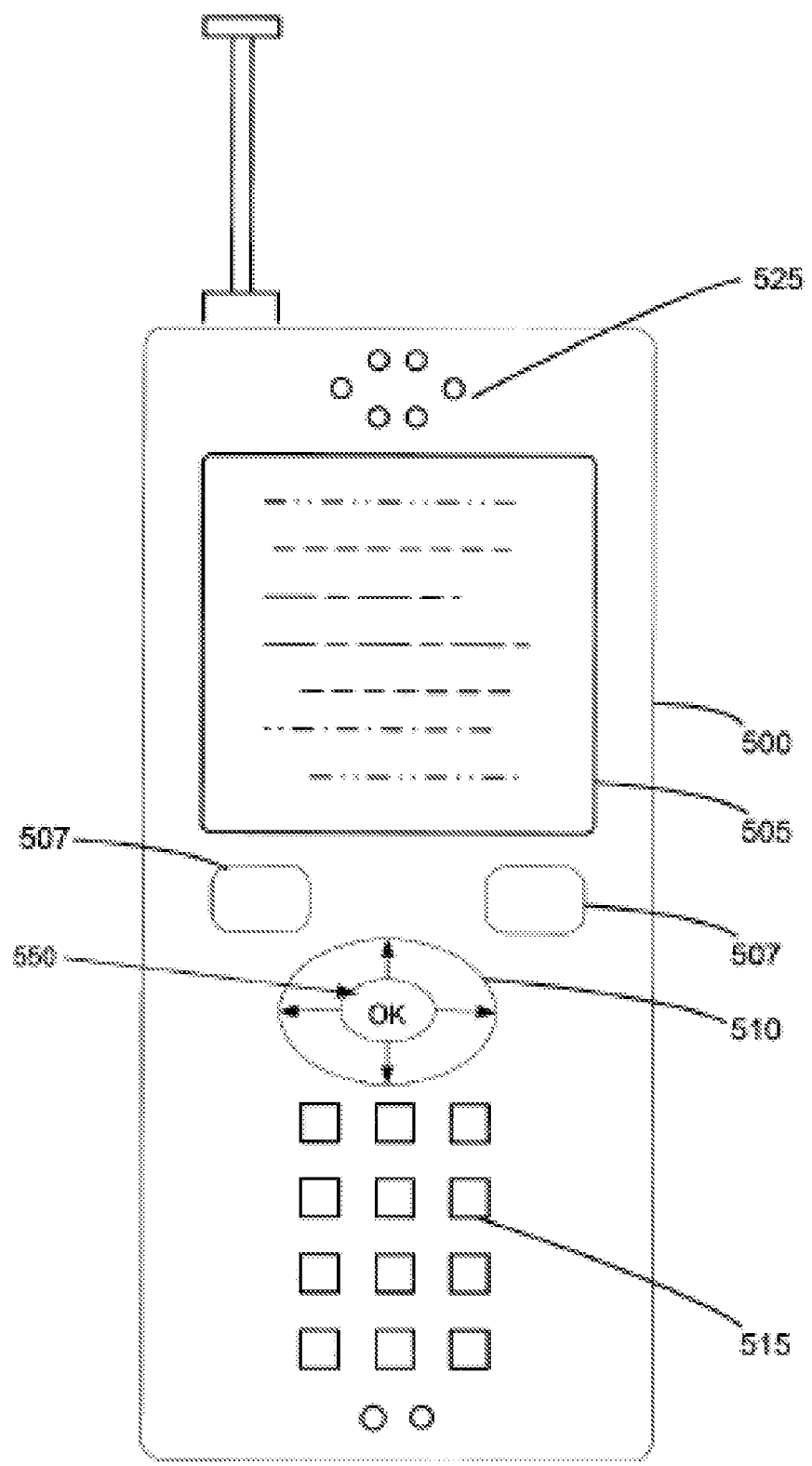
FIG. 5 is an exemplary mobile communications device.

Referring to FIG. 5, illustrated is an exemplary mobile communication device 500, and in particular, the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

Referring to FIG. 5, in one embodiment the device may illuminate one or more buttons from keypad 515, navigation buttons 510, or OK key 550. The button(s) may illuminate steady in a particular color, or may flash on/off, or in any other manner as configured in the device or by the user to illustrate a given functionality.

Figure 6:
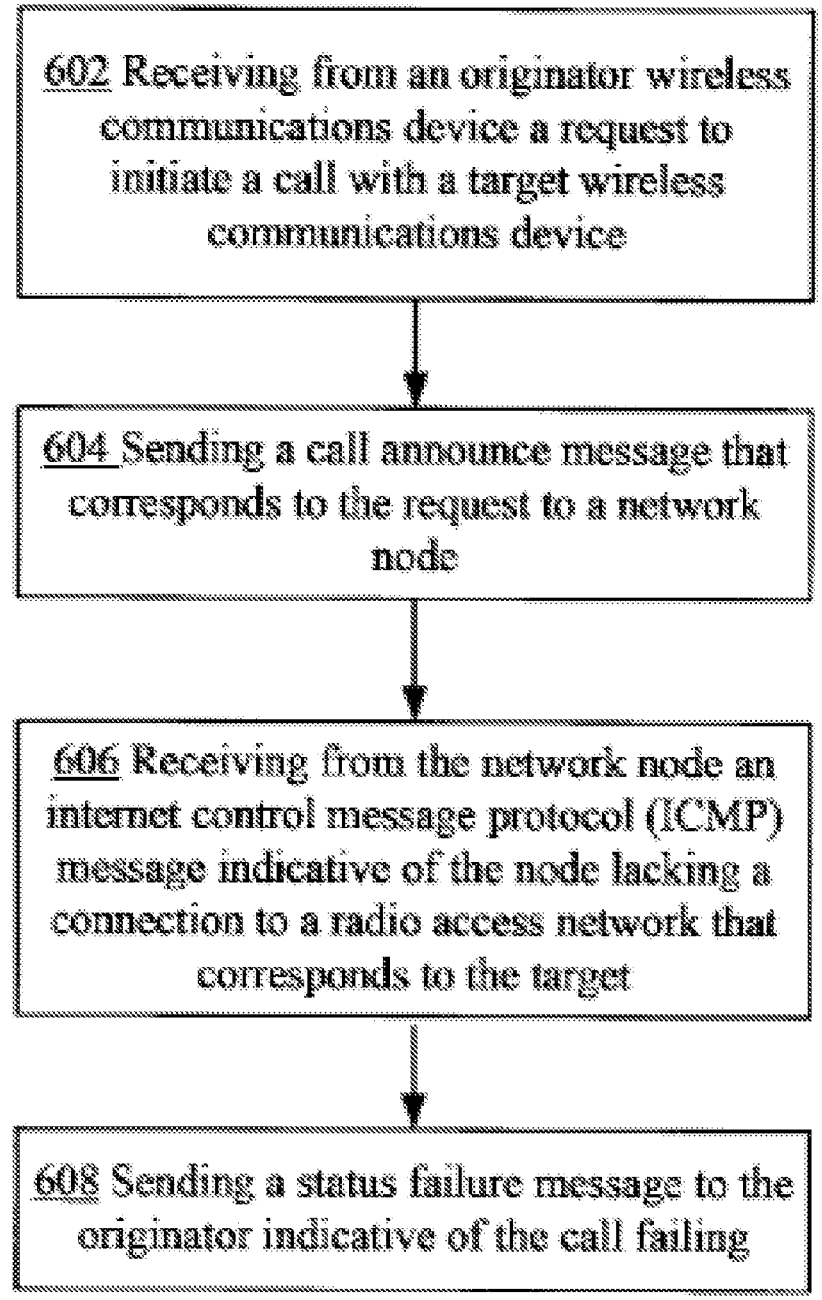
FIG. 6 depicts an exemplary process incorporating some of the embodiments disclosed herein.

FIG. 6 depicts an exemplary process incorporating some of the embodiments of reducing the time to receive a call failure indication in a wireless communications system 10. In an embodiment, the wireless communications system may comprise a CDMA2000 network or similar networks. The process may begin with receiving at the group communication server 32 from an originator wireless communications device 14 a request to initiate a call with a target wireless communications device (602). The originator device and the target device comprise push-to-talk (PTT) devices. The can be a plurality of target wireless communication devices engaging in voice PTT calls. The process continues with sending a call announce message that corresponds to the request to a network node (604). In an embodiment, the network node comprises a packet data serving node 52.

The process may continue with receiving from the network node an internet control message protocol ("ICMP") message indicative of the node lacking a connection to a radio access network that corresponds to the target device, as shown at step 606. Various PDSNs 52 currently support ICMP messages, such as the PDSN manufactured by UTSTARCOM™, serving gateways (SGW), packet data network gateways (PGW), etc. in evolved packet cores and/or similar packet core nodes. In an embodiment, the message indicative of the node lacking a connection comprises a message indicative of the node lacking an A10 connection. The ICMP message can be one from a set of an ICMP for Internet Protocol version 4 (ICMPv4) message and an ICMP for Internet Protocol version 6 (ICMPv6) message. In an embodiment, the ICMP message further comprises an indication that the network node could not determine an internet protocol ("IP") address for the target. In an embodiment, the PDSN 52 has been modified from its off-the-shelf form to return a meaningful error code, such as "no PPP connection exists for the target."

The process may continue with sending a status failure message to the target device indicative of the call failing, as shown at step 608. The status failure message can be sent on a control channel. In an embodiment, the status failure message will indicate the one or more reasons why the call failed, such as an indication of a "no PPP connection existing for the target." Errors are typically observed in situations where a PDSN 52 has recently restarted, such as after a software crash, or the target wireless device has lost power. These may lead to situations where the server does not know that IP connectivity (via the PDSN 52) has been lost for the target, but the PDSN is aware of this.

Figure 7A:
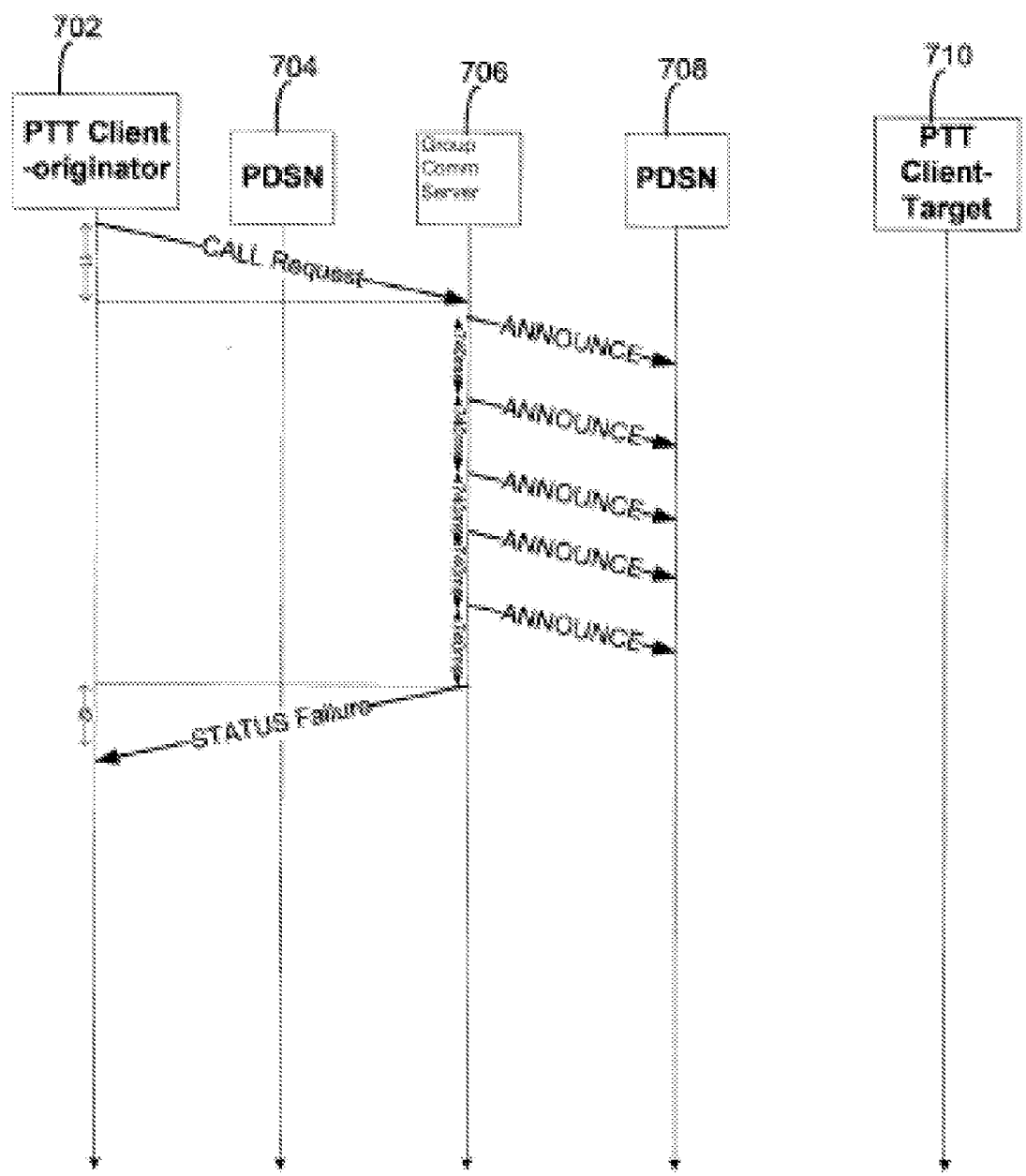
FIG. 7A depicts a call flow diagram of a common technique for receiving a call failure indication in a wireless communications system waiting for an announce mechanism to fail.

FIG. 7A depicts a call flow diagram of prior art techniques for receiving a call failure indication in a wireless communications system. In this diagram, time flows from top to bottom, such that an event occurring near the top of the figure occurs before an event occurring nearer to the bottom of the figure. In an embodiment, the originating wireless communications device 702 may send a CALL Request message intended for a target 710 through a first PDSN 704 to a group communications server 706, and this message takes a time of "t1" to pass from the originator 702 to the server 706. The group communications server 706 receives this message and then sends an ANNOUNCE message to a second PDSN 708 according to a reliability mechanism, where it will retry the ANNOUNCE message if it does not receive a corresponding message from the second PDSN 708. In the present embodiment, where the second PDSN 708 does not have an A10 connection with the appropriate RAN to forward the ANNOUNCE message, it does not forward the announce message and also does not send a message to the group communications server 706.

After the specified timeout period has elapsed, which here, for example, may be 740 ms, the server 706 sends a second ANNOUNCE message to the second PDSN 708. As each timeout period elapses, the group communications server 706 sends another ANNOUNCE message until the present total number of retries of four (for a total of five, including the initial ANNOUNCE message) is reached. Upon the final ANNOUNCE message timing out, the group communications server 706 sends the originator 702 a STATUS Failure message, which takes a time of "t2" to pass from the server 706 to the originator 702.

This technique may takes a period of time equal to the sum of t1, t2 and, for example, 3200 ms (740 ms*5) to operate. Even if t1 and t2 are instantaneous (the sum of the two is typically somewhat less than 150 ms), that is still over three seconds, when a push-to-talk environment typically deal in times a fraction of that length.

Figure 7B:
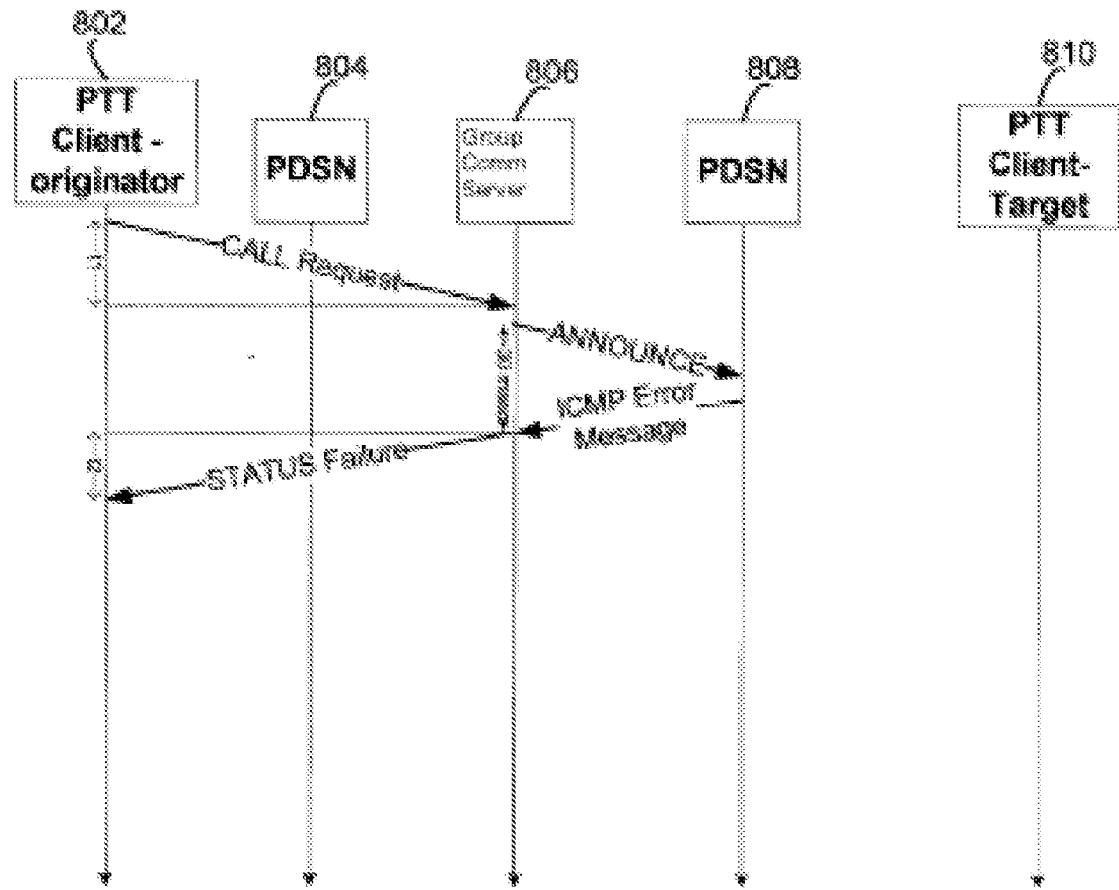
FIG. 7B depicts a call flow diagram for reducing the time to receive a call failure indication in a wireless communications system.

FIG. 7B depicts a call flow diagram for reducing the time to receive a call failure indication in a wireless communications system 10. In this diagram, time flows from top to bottom, such that an event occurring near the top of the figure occurs before an event occurring nearer to the bottom of the figure. In an embodiment, the originating wireless communications device 802 may send a CALL Request message through a first PDSN 804 to a group communications server 806, and this message takes a time of "t1" to pass from the originator to the server 806. This time period is equal to the corresponding time period in the system of FIG. 7A. The group communications server 806 receives this message and sends a corresponding ANNOUNCE message to the second PDSN 808. In the present embodiment, where the second PDSN 808 does not have an A10 connection with the appropriate RAN to forward the ANNOUNCE message, it may not forward the announce message, and immediately sends an ICMP Error Message to the group communications server 806. This period of time from when the group communications server sends the ANNOUNCE message until when it receives the ICMP Error Message depends on factors such as network congestion, but typically lasts around 30 ms. When the group communications server 806 receives the ICMP Error Message, it sends a corresponding STATUS Failure message through the first PDSN 804 to the originator 802, which takes a time of "t2" to pass from the server 806 to the originator 802.

This technique may take a period of time equal to the sum of t1, t2 and, for example, approximately 30 ms to operate. Compared to the sum of t1, t2 and 3200 ms required by the prior art technique of FIG. 7A, this is a savings of over 3 seconds—very significant in a low latency environment such as a push-to-talk system.

Figure 8:
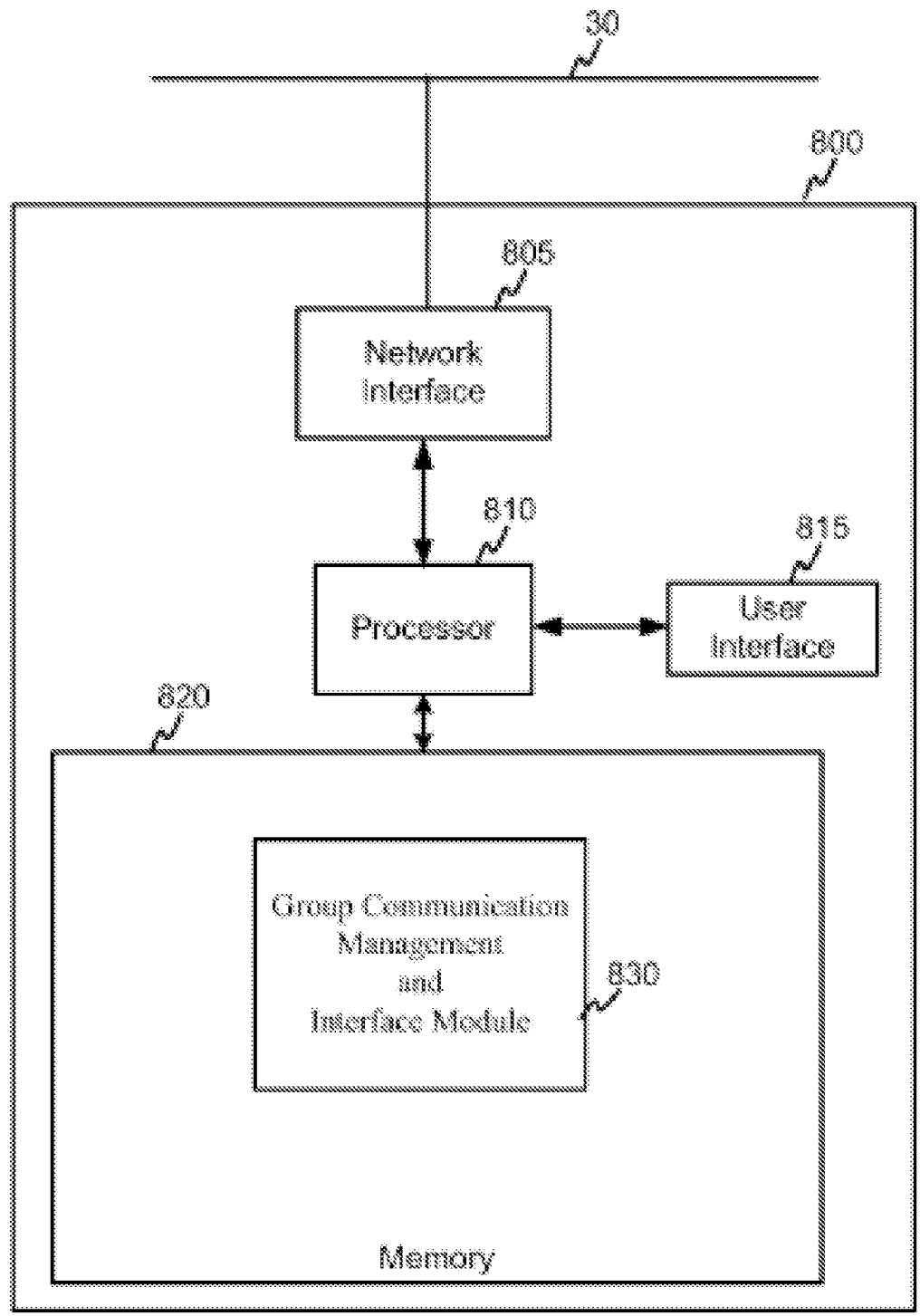
FIG. 8 depicts a block diagram illustrating an exemplary group communications server for use within the wireless communications system.

FIG. 8 is a block diagram illustrating one exemplary embodiment of a group communications server 800 (which may also be a "PTT server" and/or a "call server"). Alternatively, the group communications server 800 may also be referred to herein as a group communication server 32 shown in FIG. 2. The group communications server 800 may be a separate device which can be present on a server-side LAN 30, wherein it functionality is discussed above. For the sake of simplicity, the various features and functions illustrated in the block diagram of FIG. 8 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 8 may be further subdivided or two or more of the features or functions illustrated in FIG. 8 may be combined.

The group communications server 800 may include a network interface 805 that may be wired and/or wireless for communicating over the server side LAN. A processor 810 may be connected to the network interface 805, a user interface 815 and memory 820. The processor 810 may include one or more microprocessors, microcontrollers, and/or digital signal processors that provide processing functions, as well as other calculation and control functionality. The processor 810 accesses memory 820 for reading/writing data and/or software instructions for executing programmed functionality. The memory 820 may be on-board the processor 810 (e.g., within the same IC package), and/or the memory may be external memory to the processor and functionally coupled over a data bus.

A number of software modules and/or data tables may reside in memory 820 and be utilized by the processor 810 for managing PTT functionality, including functionality describe above. As illustrated here, within memory 820, the group communications server 800 may further include or otherwise provide a group communication management and interface module 830. While the software module 830 is illustrated in the example as being contained in memory 820, it should be recognized that in certain implementations such procedures may be provided for or otherwise operatively arranged using other or additional mechanisms. For example, all or part of software module 830 may be provided in firmware. Additionally, while in FIG. 8 the software module 830 is shown as a single distinct entity for ease of description, it should be understood that it may include a plurality of modules that are not illustrated, or otherwise be further partitioned into a differing groups of procedures.

In addition, the concepts described above can be applicable to wireless networks capable of communicating using multiple bearers established for one or more wireless telecommunication devices (referred to herein as UE). For example, some wireless networks establish a default bearer for communicating with a UE, and then can establish one or more additional bearers for different types of communications. For example, the additional bearers may be established between the UE and the wireless network using the default bearer to communicate configuration information for the additional bearer(s). In addition, for example, the additional bearer(s) may be associated with a guaranteed bit rate (GBR) to provide a quality of service (QoS) for certain types of data at the UE, such as voice or other real-time data. In one example, third generation partnership project (3GPP) long term evolution (LTE) systems can provide a voice-over-LTE (VoLTE) configuration where a UE communicates with an LTE network over a default bearer and one or more dedicated bearers configured to provide a GBR that allows for providing reliable voice call services at the UE.

Figure 9:
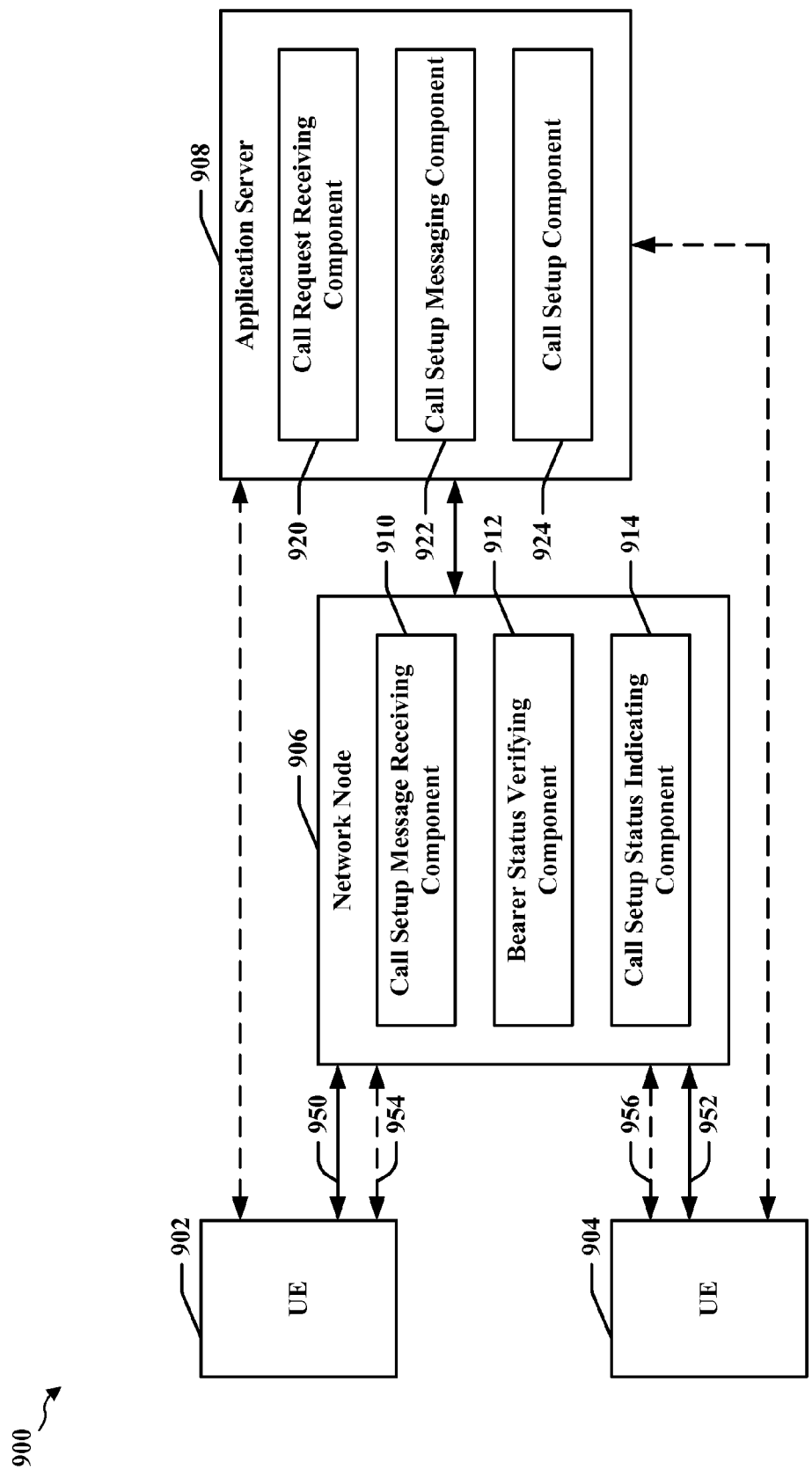
FIG. 9 is a block diagram illustrating an example system for attempting to establish a call in a wireless network.
Figure 10:
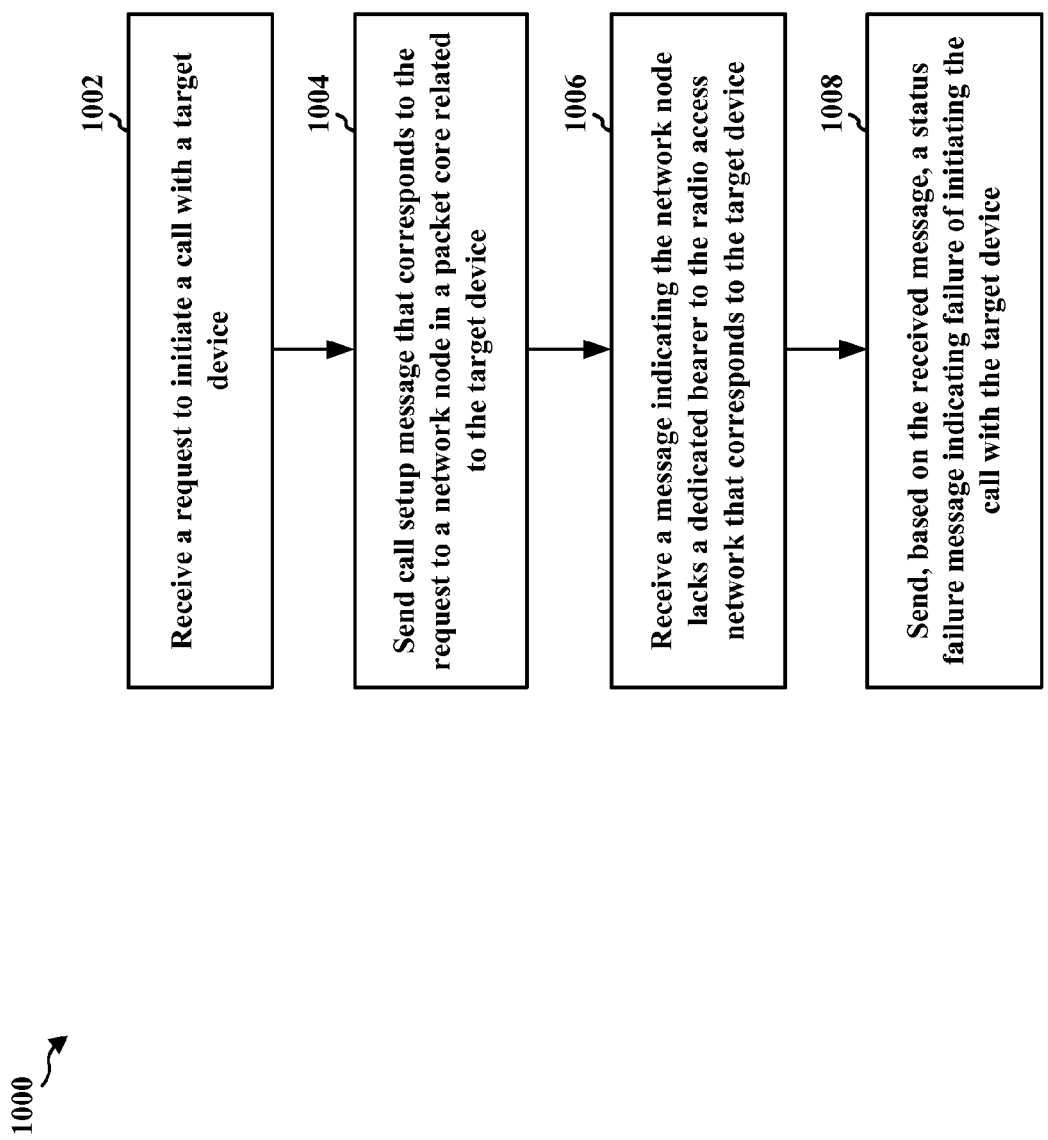
FIG. 10 is a diagram of an example method for indicating failure of a call setup in a wireless network.
Figure 11:
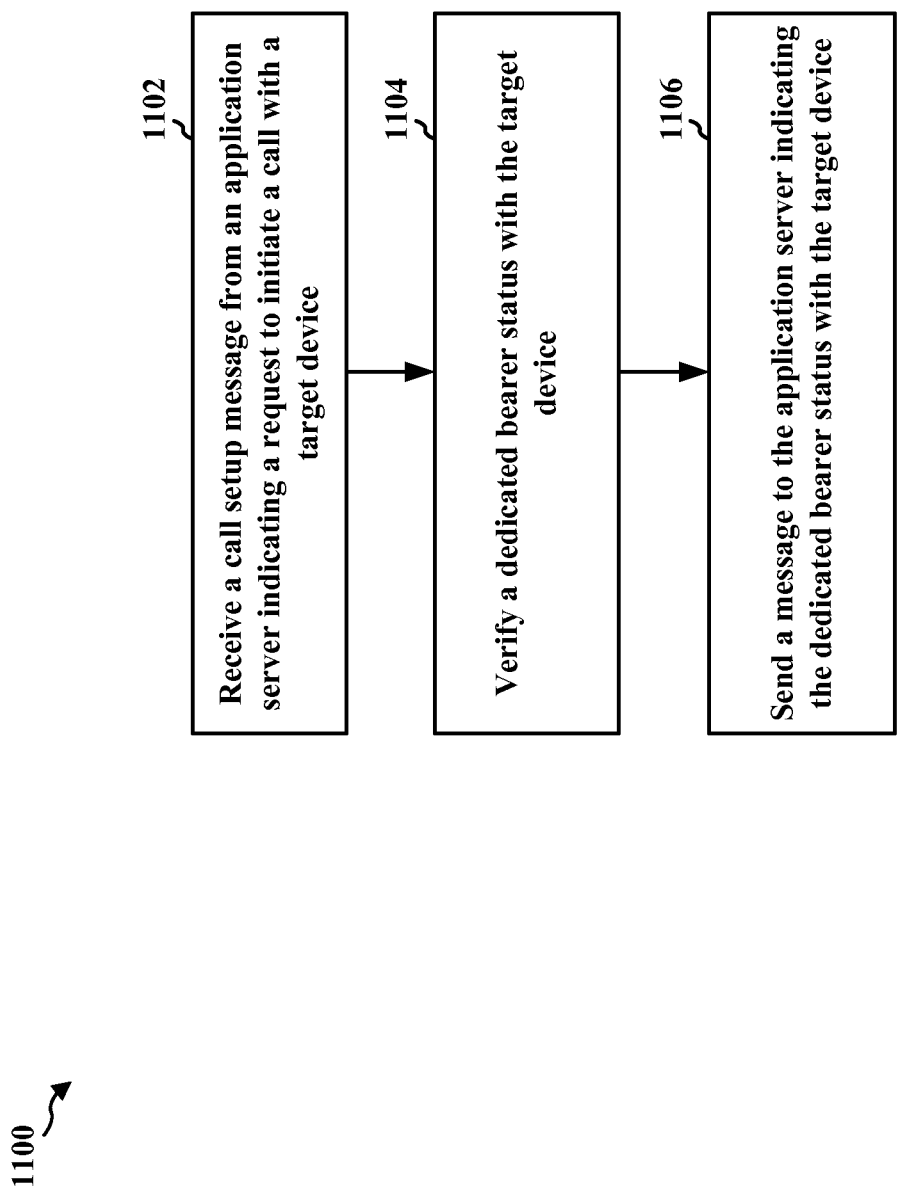
FIG. 11 is a diagram of an example method for indicating a bearer status of a device in a wireless network.

In FIGS. 9-11, aspects of an example apparatus and method are depicted with reference to one or more components and one or more methods that may perform the actions or functions described herein. Although the operations described below in FIGS. 10 and 11 are presented in a particular order and/or as being performed by an example module, it should be understood that the ordering of the actions and the modules performing the actions may be varied, depending on the implementation. Moreover, it should be understood that the following actions or functions may be performed by a specially-programmed processor, a processor executing specially-programmed software or computer-readable media, or by any other combination of a hardware module and/or a software module capable of performing the described actions or functions.

FIG. 9 illustrates an example system 900 for attempting to establish a call in a wireless network. System 900 includes UEs 902 and 904 that communicate with a network node 906 in communicating with a wireless network. It is to be appreciated that UEs 902 and 904 can communicate with one or more additional nodes to access network node 906, where the one or more additional nodes and/or network node 906 can include one or more evolved Node Bs (eNBs) or other RAN components, mobility management entity (MME), serving gateway (SGW), packet data network gateway (PGW), or other packet core components, etc., as described herein in an LTE environment. UEs 902 and 904 may be similar to or may include the devices 14, 16, 18, 70, 72, 74, 76, 500, 702, 802, described above. In addition, it is to be appreciated that UEs 902 and 904 can communicate with different network nodes 906 in different wireless networks over the same or different radio access networks (RAN, also referred to herein as carrier network), which may or may not use the same radio access technology (RAT) in communicating with UE 902 or 904.

Moreover, UEs 902 and 904 can communicate with network node 906 (or respective network nodes) over at least respective default bearers 950, 952 between the network node 906 and the UEs 902 and 904 (e.g. via one or more RAN components, such as an eNB. For example, the default bearers 950, 952 can be established by the network node 906 or other network devices (e.g., an MME), and may have associated radio bearers in the RAN between eNBs and UEs 902 and 904 that correspond to the default bearers 950, 952. UEs 902 and 904 may also communicate with network node 906 (or respective network nodes) over one or more respective dedicated bearers 954, 956 between the network node 906 and the RAN as well. As described, dedicated bearers 954, 956 can be established with network node 906 (or other components of the wireless network or related packet core) over respective default bearers 950, 952, and can provide a GBR to allow a QoS for one or more services, such as VoLTE.

System 900 also includes an application server 908 that the UEs 902 and 904 can access via the network node 906 (and/or one or more additional nodes). In this regard, for example, network node 906 can be a node in a packet core (e.g., an evolved packet core (EPC) as described further herein in an LTE environment) that provides packet-based access to the application server 908. Moreover, network node 906 can also communicate with UEs 902 and 904 over one or more RANs, as described, to act as packet gateway in providing the UEs 902 and 904 with packet-based access to the application server 908. Application server 908 can facilitate providing VoLTE or other services between various devices in the wireless network, such as UEs 902 and/or 904. Additionally, for example, network node 906 can be similar to a PDSN (e.g., PDSN 52, 704, 708, 804, 808) and/or application server 908 can be similar to a group communication server (e.g., group communication server 32, 706, 800, 806), as described herein, providing similar functions in addition or alternatively to those described below.

In this regard, network node 906 and application server 908 can also include a network interface 805, processor 810, user interface 815, and memory 820, as shown and described with respect to group communication server 800 in FIG. 8, for performing aspects described of the network node 906 and application server 908. For example, processor 810 can execute functions described below for one or more components of network node 906 (e.g., call setup message receiving component 910, bearer status verifying component 912, call setup status indicating component 914, etc.), one or more components of application server 908 (e.g., call request receiving component 920, call setup messaging component 922, call setup component 924), etc. Moreover, in an example, memory 820 can store instructions for executing the various components and/or for assisting in carrying out functions of these components, as described herein.

FIG. 10 illustrates an example method 1000 for attempting to initiate call setup between devices in a wireless network. Method 1000 includes, at Block 1002, receiving a request to initiate a call with a target device. Application server 908 (FIG. 9) includes a call request receiving component 920 for receiving the request to initiate the call with the target device. For example, call request receiving component 920 can receive the request from UE 902 (e.g., via one or more components of a radio access network (RAN) and a packet core) based at least in part on UE 902 determining to originate a call to the target device (e.g., based on receiving input on an interface of UE 902 related to initiating the call to UE 904). For example, the request can include one or more identifiers of the target device to which the call is to be initiated, such as UE 904. As described, network node 906 and application server 908 can be part of a LTE network such that the call request relates to setting up a VoLTE call between originating UE 902 and target UE 904.

Method 1000 further includes, at Block 1004, sending a call setup message that corresponds to the request to a network node in a packet core related to the target device. Application server 908 includes a call setup messaging component 922 for generating and sending the call setup message. This can be similar to the ANNOUNCE message described above. In addition, call setup messaging component 922 can determine the network node to which to send the message (e.g., network node 906) based at least in part on identifying the network node as related to the target node. For example, the call setup request may include an identifier of the network node or an associated network address, location, or type, from which the application server can identify the network node. In another example, application server 908 can look-up the network node based at least in part on network node information received for the target device (e.g., when the target device is registered on the wireless network and/or is registered with application server 908 such to receive VoLTE services, etc.). In yet another example, application server 908 can be configured to communicate with one network node 906 to access the packet core, and the network node 906 can appropriately route the call setup message if necessary. In addition, it is to be appreciated that UE 902 can request to initiate a call with a plurality of target UEs (e.g., as indicated in the request), and thus call setup messaging component 922 can send call setup messages for each target UE, in one example. Aspects of receiving the call setup message and providing call status information are described in FIG. 11, which is described in further detail below in conjunction with FIGS. 9 and 10.

FIG. 11 illustrates and example method 1100 for providing call setup status information based on verifying bearer status for a device to which the call is to be setup. Method 1100 includes, at Block 1102, receiving a call setup message from an application server indicating a request to initiate a call with a target device. Network node 906 can include a call setup message receiving component 910 for receiving the call setup message sent from the application server 908, as described above. It is to be appreciated that this message can be a packet data network message. The call setup message, for example, can indicate a target device to which to setup the call (e.g., UE 904), which can be specified in the call setup request from UE 902.

Method 1100 also includes, at Block 1104, verifying a dedicated bearer status with the target device. Network node 906 includes a bearer status verifying component 912 for verifying the dedicated bearer status with the target device (e.g., UE 904). Thus, for example, bearer status verifying component 912 can verify a status of dedicated bearer 956 for UE 904 with the RAN regardless of a status of default bearer 952 for the UE 904 with the RAN. In this regard, the default bearer 952 may be established between network node 906 (or another component of the network) and the RAN for communicating with UE 904 and can actively facilitate communications between the UE 904 and the network, while the dedicated bearer 956 over which data related to the application server 908 (e.g., VoLTE data) is communicated may not be established or may not be active with the UE 904. Thus, the UE 904 can be connected to the network via the default bearer 952 but may not be able to provide a QoS for the application server 908 services due to not having the established dedicated bearer 956 that provides a GBR to achieve the QoS. In addition, in an example, network node 906 may have other dedicated bearers established with the RAN for UE 904, but the other dedicated bearers may not have an associated GBR to achieve the QoS desired for application server 908 services. In this example, verifying the dedicated bearer status can include verifying the status for one or more dedicated bearers able to provide the QoS for the application server 908 services. For example, verifying the status of the bearer can include determining whether an address for the bearer can be determined (e.g., an internet protocol (IP) address received as part of establishing the bearer) at the network node 906.

Method 1100 further includes, at Block 1106, sending a message to the application server indicating the dedicated bearer status with the target device. Network node 906 includes a call setup status indicating component 914 for indicating the dedicated bearer status of the target device. In this regard, where the dedicated bearer 956 is not established, has failed, is not providing a related GBR, etc., for example, call setup status indicating component can send a status of the dedicated bearer to the application server 908 indicating that the bearer is not established, has failed, is not providing the GBR, is in a certain state, and/or the like. In an example, the message indicating that the dedicated bearer 956 is not established can be an ICMP Error Message, as described above. In addition, for example, network node 906 can refrain from forwarding the call setup message (e.g., to UE 904, a network node thereof, a RAN component communicating therewith, etc.) based at least in part on determining the dedicated bearer 956 is not established or has otherwise failed. Further blocks of method 1000 describe receiving and further processing the message indicating the dedicated bearer status.

For example, method 1000 further includes, at Block 1006, receiving a message indicating the network node lacks a dedicated bearer to the radio access network that corresponds to the target device. Call setup messaging component 922 can receive the message sent from the network node 906, as described above, and can determine that the message indicates the lack of dedicated bearer (e.g., based on a type of message, such as an ICMP Error Message, an error code or result value specified in the message, and/or the like). Method 1000 additionally includes, at Block 1008, sending, based on the received message, a status failure message indicating failure of initiating the call with the target device. Thus, where the message from network node 906 indicates that the network node 906 lacks a dedicated bearer to the radio access network that corresponds to UE 904, a call setup component 924 included in the application server 908 can respond to the call request from UE 902 by indicating a failure to initiate the call based on the lack of dedicated bearer for the UE 904. Thus, for example, since the UE 904 does not have the appropriate bearer to provide QoS for setting up a call for application server 908, call setup component 924 fails the call setup at the UE 902. This can occur, as described, even though UE 904 may have an associated default bearer 952 with the network node 906 for communicating best efforts or non-GBR data therewith. Moreover, in a specific example, call setup component 924 can send the failure message to UE 902 over a control channel, such as physical downlink control channel (PDCCH) in LTE by traversing network node 906, the RAN of UE 902, etc. to communicate the message over the control channel.

Figure 12:
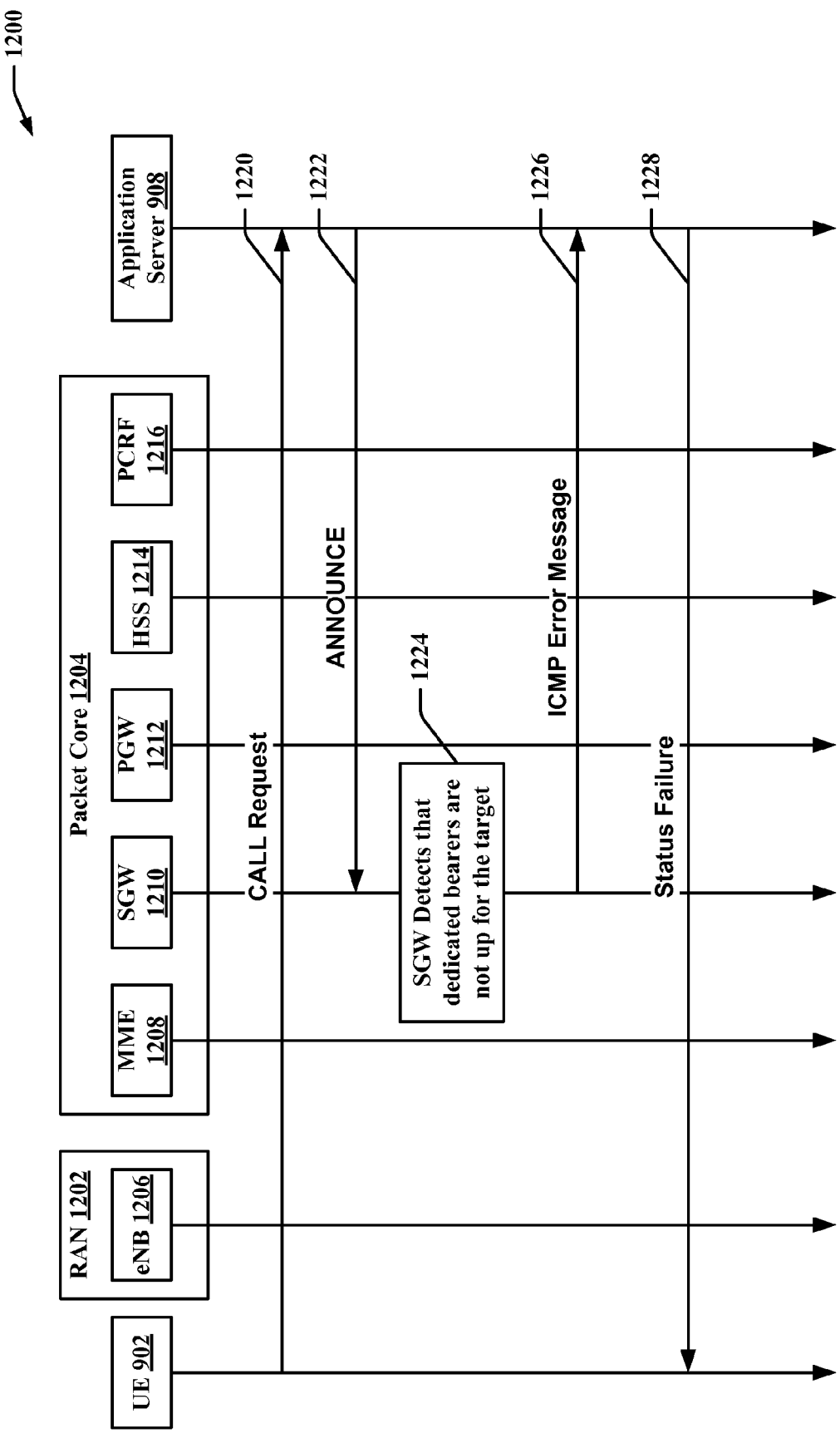
FIG. 12 depicts an example call flow diagram for receiving a call failure indication in a wireless network.

FIG. 12 illustrates an example call flow diagram in a system 1200 for receiving a call failure indication in a wireless network. System 1200 includes a UE 902 that communicates with an application server 908 via a RAN 1202 connected to a packet core 1204. Example environments providing this configuration are described further herein. RAN 1202 can include one or more eNBs 1206. Packet core 1204 can include a an MME 1208 for providing bearer establishment for the UE 902 (e.g., between UE 902 and eNB 1206 and also between RAN 1202 and packet core 1204), SGW 1210, PGW 1212, home subscriber server (HSS) 1214, and a policy rules and charging function (PCRF) 1216. In addition, for example, eNB 1206 can provide similar functions in the RAN 1202 as base station 60 in carrier network 54, described above.

UE 902 can transmit a CALL request 1220 to application server 908 via RAN and packet core 1204, as described. The CALL request 1220 can indicate a target device with which to setup the call, as described. Application server 908 can receive the request, and can generate an ANNOUNCE message 1222 for communicating to the packet core 1204 (e.g., to SGW 1210, which may correspond to network node 906). SGW can detect that dedicated bearers for the target device are not up at 1224, which can be based on receiving the ANNOUNCE message 1222. Accordingly, SGW can refrain from forwarding the ANNOUNCE message 1222 (e.g., to the target device via RAN 1202 or a different RAN), and can instead transmit an ICMP Error Message 1226 to the application server 908, as described. The ICMP Error Message 1226, in one example, can indicate that the bearer for the target device at RAN 1202 is not up or is otherwise not established. Based on receiving the ICMP Error Message 1226, application server 908 can transmit a Status Failure 1228 for the CALL Request 1220 to UE 902. As described, in one example, the Status Failure 1228 may be transmitted over a control channel, such as a PDCCH between eNB 1206 and UE 902.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 13:
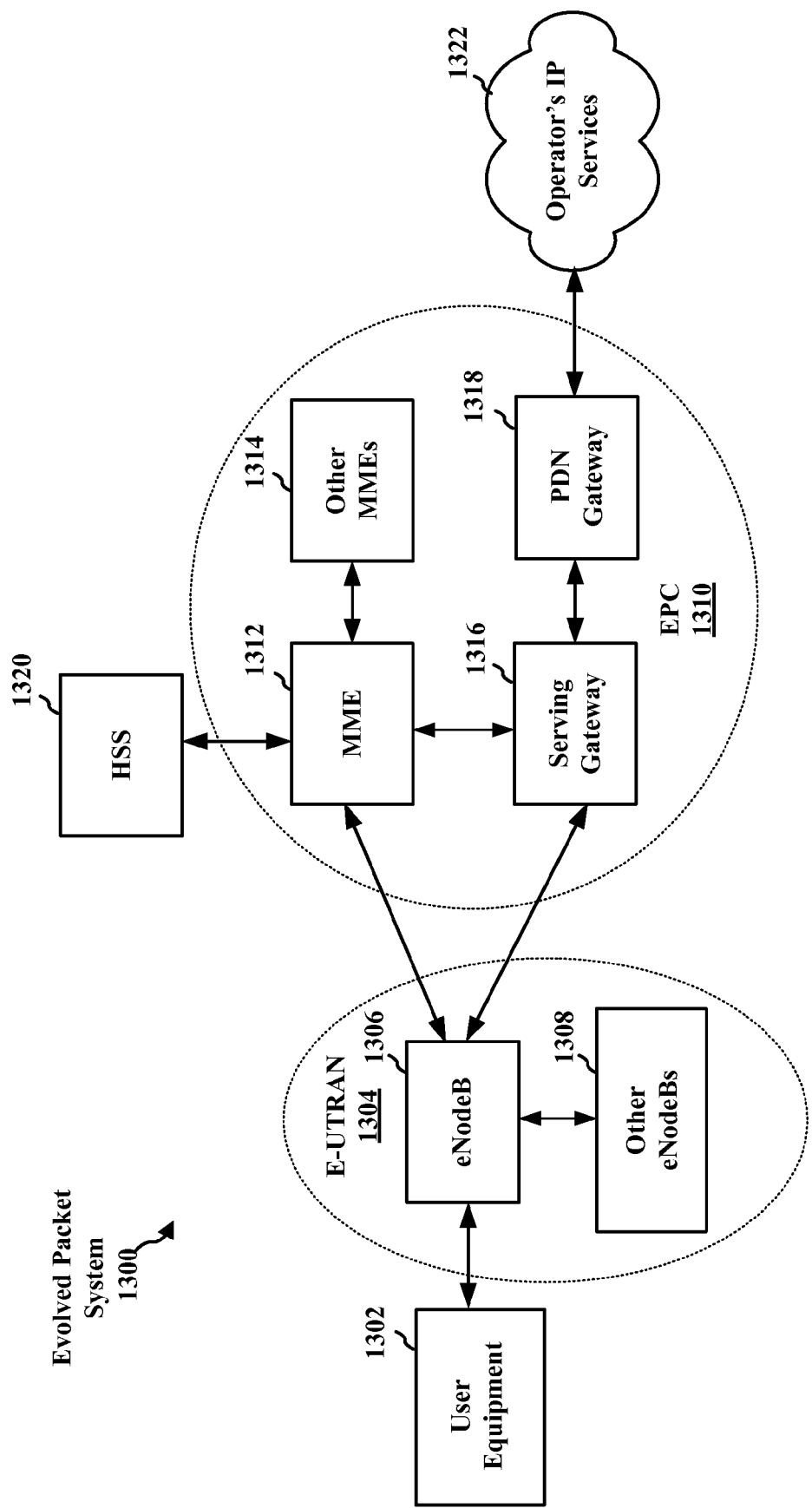
FIG. 13 is a diagram illustrating an example of a network architecture in accordance with aspects described herein.

FIG. 13 is a diagram illustrating LTE network architecture. The LTE network architecture may be referred to as an Evolved Packet System (EPS) 1300. The EPS 1300 may include one or more user equipment (UE) 1302, an Evolved UMTS Terrestrial Radio Access Network (E-UTRAN) 1304, an Evolved Packet Core (EPC) 1310, a Home Subscriber Server (HSS) 1320, and an Operator's IP Services 1322. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 1306 and other eNBs 1308. The eNB 1306 provides user and control planes protocol terminations toward the UE 1302. The eNB 1306 may be connected to the other eNBs 1308 via a backhaul (e.g., an X2 interface). The eNB 1306 may also be referred to as a base station, a base transceiver station, a radio base station, a radio transceiver, a transceiver function, a basic service set (BSS), an extended service set (ESS), or some other suitable terminology. The eNB 1306 provides an access point to the EPC 1310 for a UE 1302. Examples of UEs 1302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 1302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 1306 is connected by an S1 interface to the EPC 1310. The EPC 1310 includes a Mobility Management Entity (MME) 1312, other MMEs 1314, a Serving Gateway 1316, and a Packet Data Network (PDN) Gateway 1318. The MME 1312 is the control node that processes the signaling between the UE 1302 and the EPC 1310. Generally, the MME 1312 provides bearer and connection management. All user IP packets are transferred through the Serving Gateway 1316, which itself is connected to the PDN Gateway 1318. The PDN Gateway 1318 provides UE IP address allocation as well as other functions. The PDN Gateway 1318 is connected to the Operator's IP Services 1322. The Operator's IP Services 1322 may include the Internet, the Intranet, an IP Multimedia Subsystem (IMS), and a PS Streaming Service (PSS).

UE 1302 can also include a UE 902 or 904 as described in connection with FIG. 9 above and/or other devices described herein. In addition, RAN 1202 can include E-UTRAN 1304, and packet core 1204 can include EPC 1310. In addition, in this regard, eNB 1306 can include eNB 1206, MME 1312 or other MMEs 1314 can include MME 1208, SGW 1316 can include SGW 1210, PGW 1318 can include PGW 1212, etc. Thus, one or more of the nodes of the EPC 1310 can include the network node 906, as described, including the various described components to facilitate providing a bearer status to an application server. HSS 1320 can include HSS 1214. In addition, operator's IP services 1322 may include the application server 908, including the various components that facilitate call setup (e.g., using VoLTE), as described herein.

Figure 14:
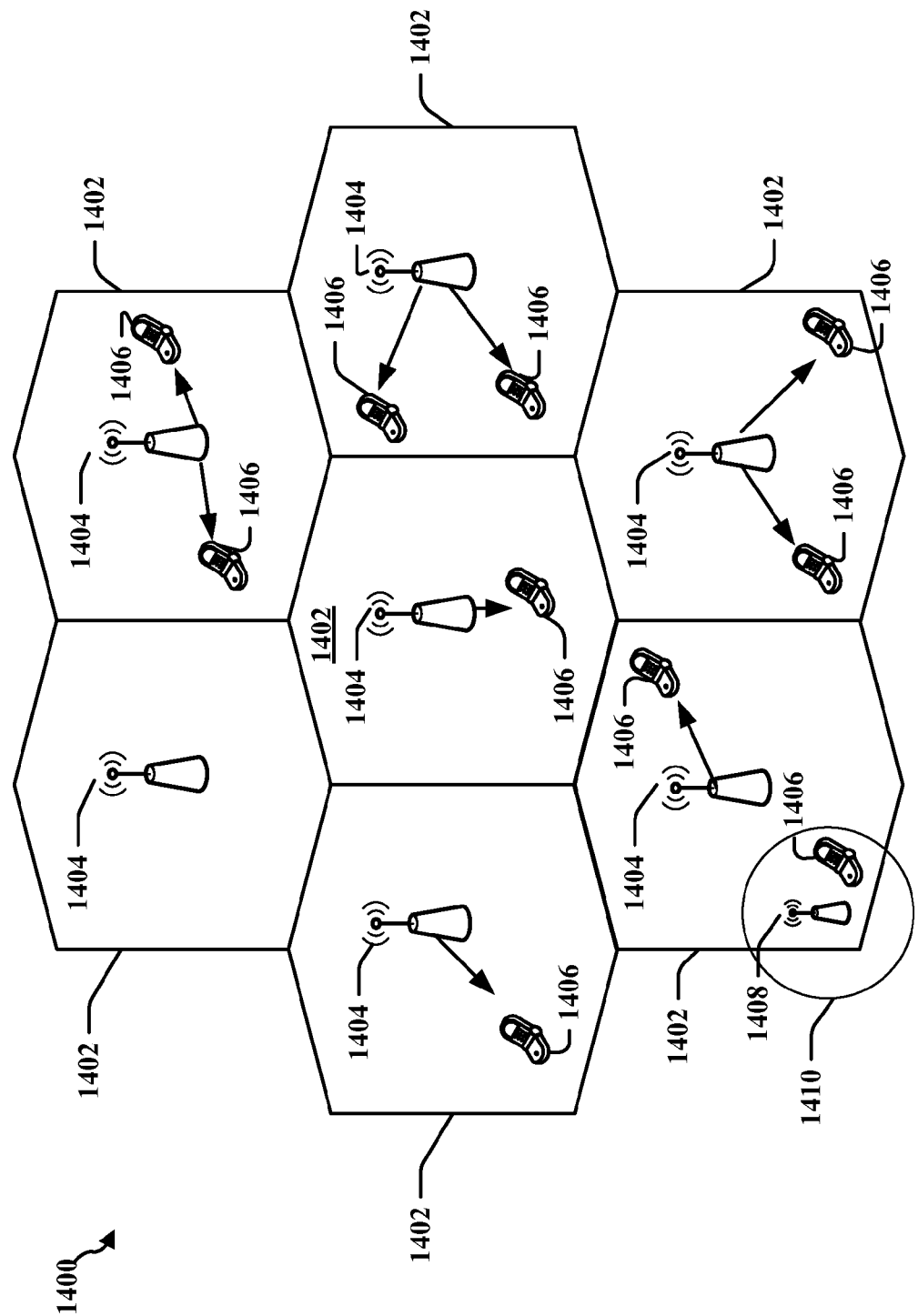
FIG. 14 is a diagram illustrating an example of an access network in accordance with aspects described herein.

FIG. 14 is a diagram illustrating an example of an access network 1400 in LTE network architecture. In this example, the access network 1400 is divided into a number of cellular regions (cells) 1402. One or more lower power class eNBs 1408 may have cellular regions 1410 that overlap with one or more of the cells 1402. The lower power class eNB 1408 may be a small cell (e.g., femto cell, such as a home eNB (HeNB), pico cell, micro cell, or remote radio head (RRH), etc.). As such, as used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The macro eNBs 1404 are each assigned to a respective cell 1402 and are configured to provide an access point to the EPC 1310 for all the UEs 1406 in the cells 1402 through one or more radio bearers established between the eNBs 1404 and UEs 1406 and network bearers established between the eNBs 1404 and EPC 1310. There is no centralized controller depicted in this example of an access network 1400, but a centralized controller may be used in alternative configurations. The eNBs 1404 are responsible for all radio related functions including radio bearer control, admission control, mobility control, scheduling, security, and connectivity to the serving gateway 1316. Moreover, for example, UEs 1406 can include UE 902 or 904 that can request call setup between one another and/or with additional UEs, and eNBs 1404 can include eNB 1306, other eNBs 1308, etc.

The modulation and multiple access scheme employed by the access network 1400 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1404 may have multiple antennas supporting MIMO technology. The use of MIMO technology enables the eNBs 1404 to exploit the spatial domain to support spatial multiplexing, beamforming, and transmit diversity. Spatial multiplexing may be used to transmit different streams of data simultaneously on the same frequency. The data streams may be transmitted to a single UE 1406 to increase the data rate or to multiple UEs to increase overall system capacity. This is achieved by spatially pre-coding each data stream (i.e., applying a scaling of amplitude and phase) and then transmitting each spatially pre-coded stream through multiple transmit antennas on the DL. The spatially pre-coded data streams arrive at the UE(s) 1406 with different spatial signatures, which enables each of the UE(s) 1406 to recover the one or more data streams destined for that UE 1406. On the UL, each UE 1406 transmits a spatially pre-coded data stream, which enables the eNB 1404 to identify the source of each spatially pre-coded data stream.

Spatial multiplexing is generally used when channel conditions are good. When channel conditions are less favorable, beamforming may be used to focus the transmission energy in one or more directions. This may be achieved by spatially pre-coding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 15:
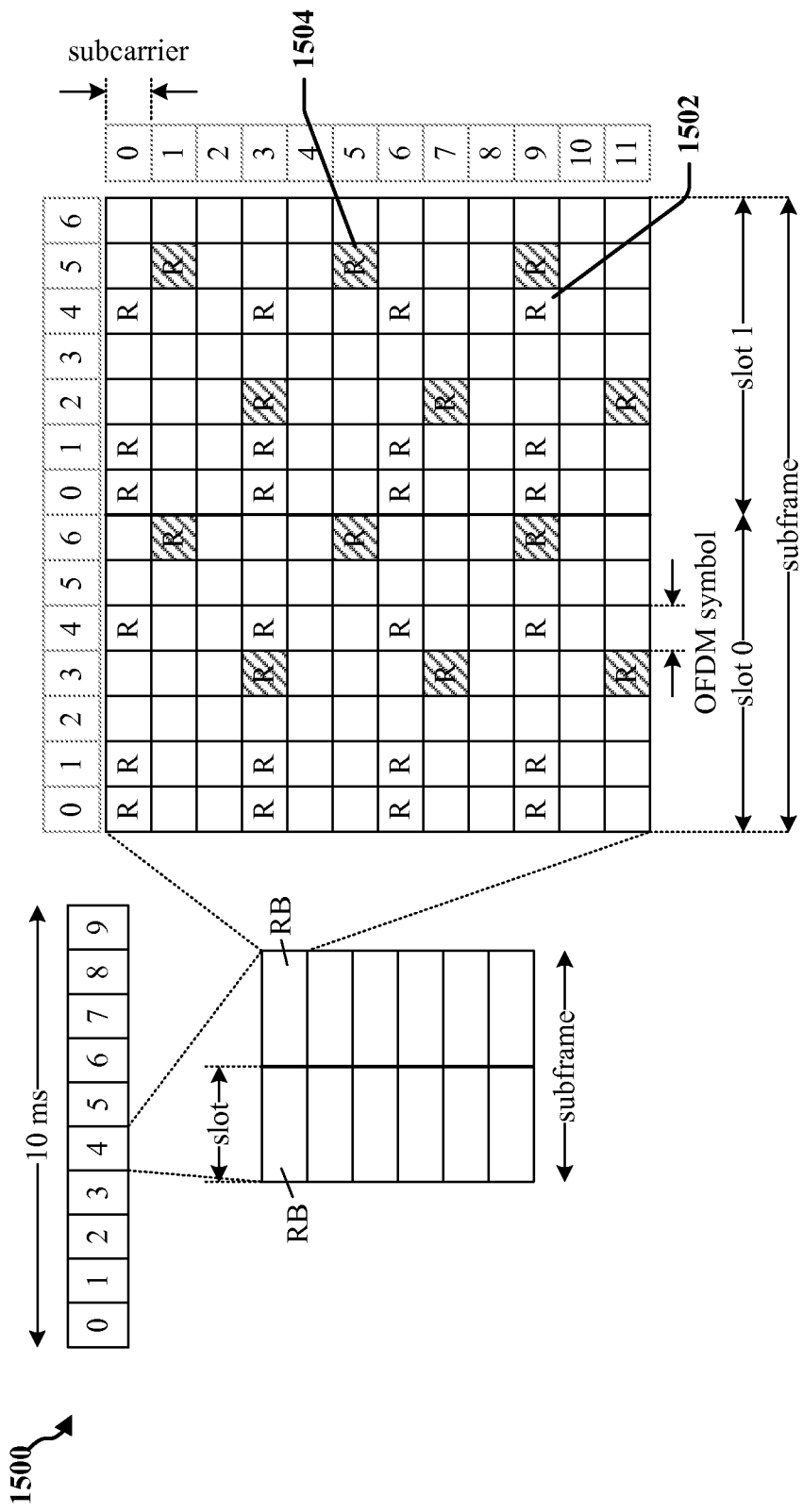
FIG. 15 is a diagram illustrating an example of a downlink (DL) frame structure in third generation partnership project (3GPP) long term evolution (LTE) in accordance with aspects described herein.

FIG. 15 is a diagram 1500 illustrating an example of a DL frame structure in LTE. For example, a UE, such as UE 902, 904, 1302, 1406, and/or eNB, such as eNB 1306, 1308, 1404, as described herein, can use the frame structures described herein in communicating in a wireless network. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain, resulting in a total of 72 resource elements. Some of the resource elements, as indicated as R 1502, 1504, include DL reference signals (DL-RS). The DL-RS include Cell-specific RS (CRS) (also sometimes called common RS) 1502, such as CSI-RS, and UE-specific RS (UE-RS) 1504. UE-RS 1504 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 16:
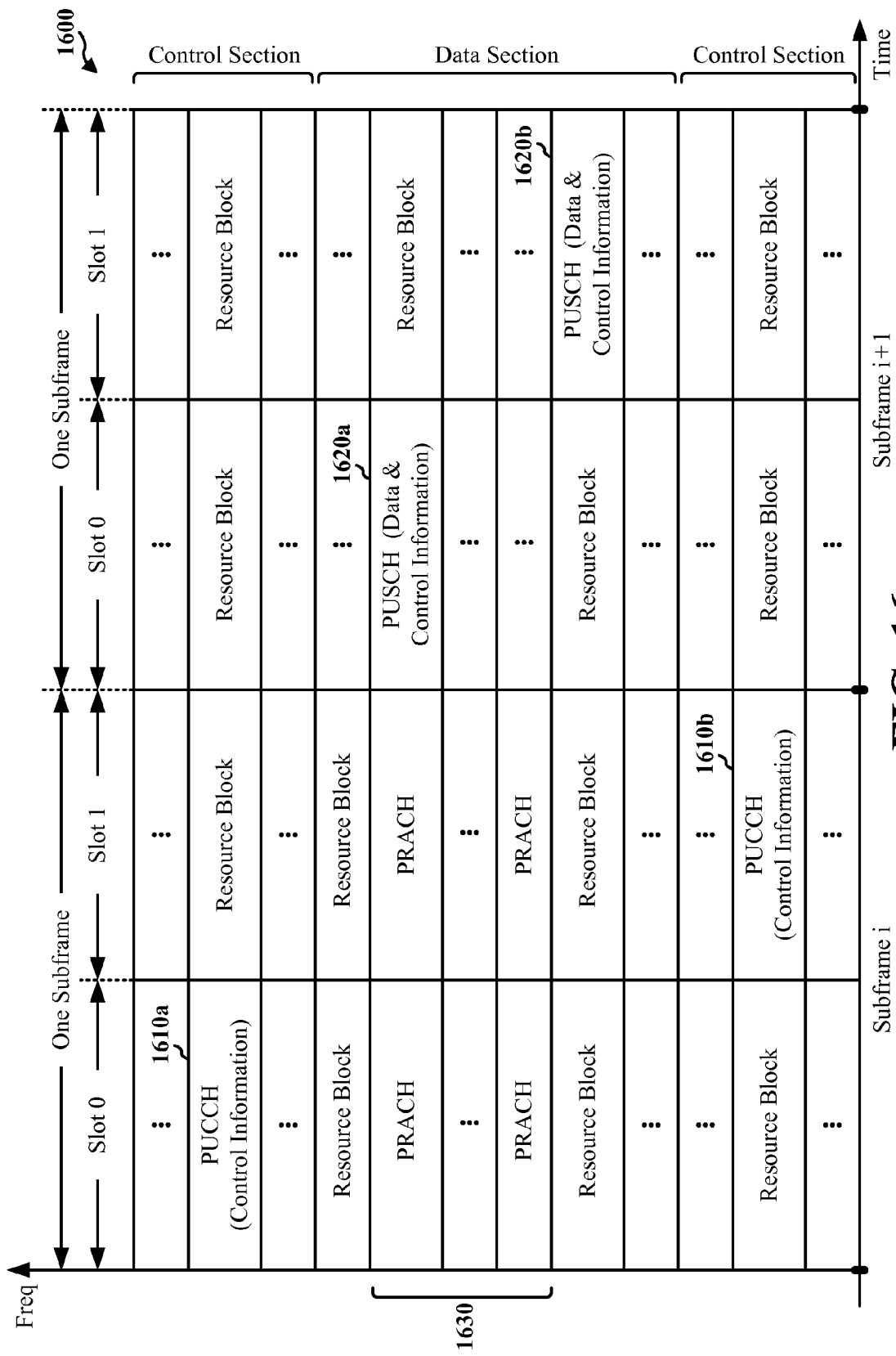
FIG. 16 is a diagram illustrating an example of an uplink (UL) frame structure in LTE in accordance with aspects described herein.

FIG. 16 is a diagram 1600 illustrating an example of an UL frame structure in LTE. For example, a UE, such as UE 902, 904, 1302, 1406, and/or eNB, such as eNB 1306, 1308, 1404, as described herein, can use the frame structures described herein in communicating in a wireless network. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1610a, 1610b in the control section to transmit control information to an eNB. The UE may also be assigned resource blocks 1620a, 1620b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 1630. The PRACH 1630 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single sub-frame (1 ms) or in a sequence of few contiguous sub-frames and a UE can make only a single PRACH attempt per frame (10 ms).

Figure 17:
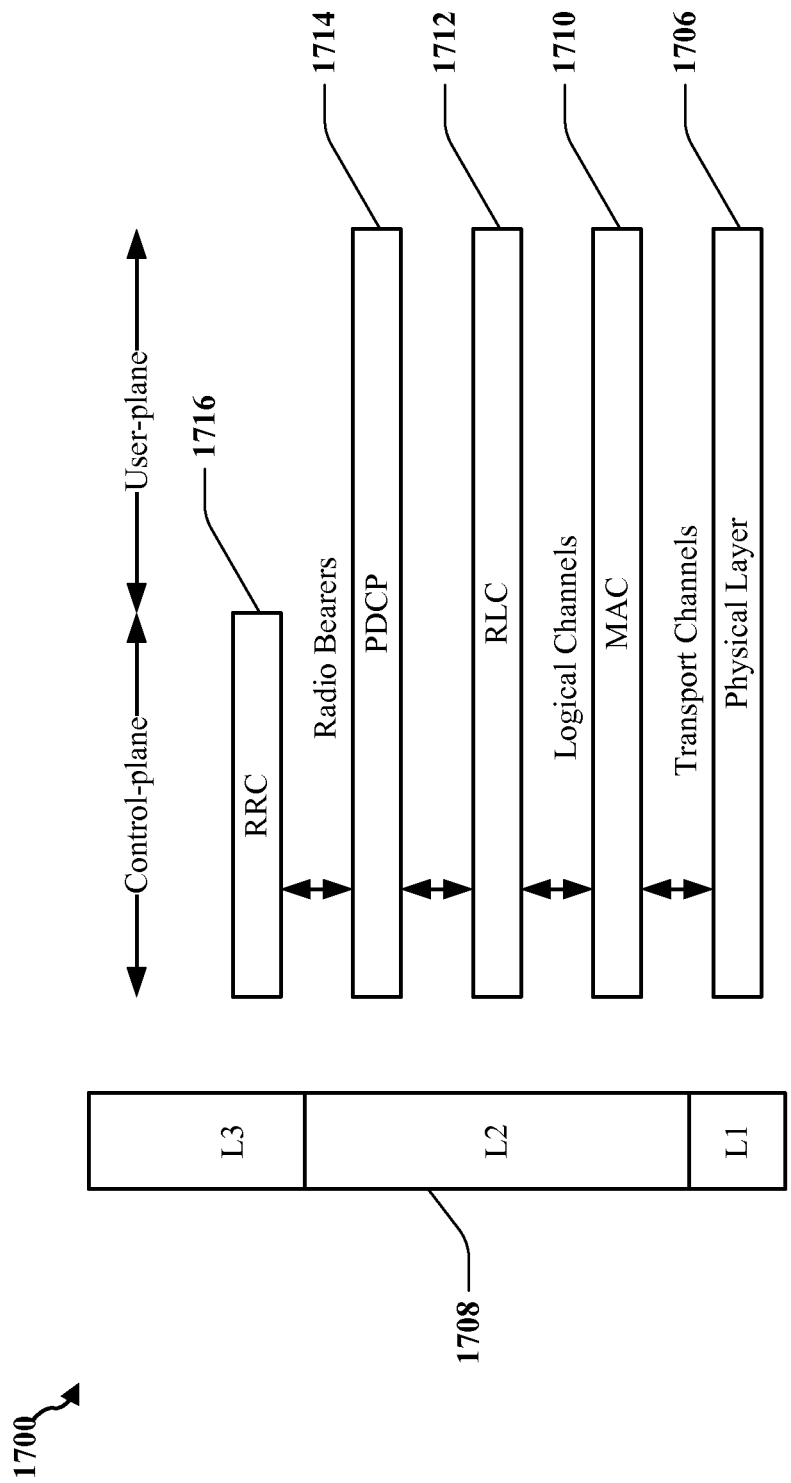
FIG. 17 is a diagram illustrating an example of a radio protocol architecture for the user and control planes in accordance with aspects described herein.

FIG. 17 is a diagram 1700 illustrating an example of a radio protocol architecture for the user and control planes in LTE. For example, a UE, such as UE 902, 904, 1302, 1406, and/or eNB, such as eNB 1306, 1308, 1404, as described herein, can use the radio protocol architecture described herein in communicating in a wireless network. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1706. Layer 2 (L2 layer) 1708 is above the physical layer 1706 and is responsible for the link between the UE and eNB over the physical layer 1706.

In the user plane, the L2 layer 1708 includes a media access control (MAC) sublayer 1710, a radio link control (RLC) sublayer 1712, and a packet data convergence protocol (PDCP) 1714 sublayer, which are terminated at the eNB on the network side. Although not shown, the UE may have several upper layers above the L2 layer 1708 including a network layer (e.g., IP layer) that is terminated at the PDN gateway 118 on the network side, and an application layer that is terminated at the other end of the connection (e.g., far end UE, server, etc.).

The PDCP sublayer 1714 provides multiplexing between different radio bearers and logical channels. The PDCP sublayer 1714 also provides header compression for upper layer data packets to reduce radio transmission overhead, security by ciphering the data packets, and handover support for UEs between eNBs. The RLC sublayer 1712 provides segmentation and reassembly of upper layer data packets, retransmission of lost data packets, and reordering of data packets to compensate for out-of-order reception due to hybrid automatic repeat request (HARQ). The MAC sublayer 1710 provides multiplexing between logical and transport channels. The MAC sublayer 1710 is also responsible for allocating the various radio resources (e.g., resource blocks) in one cell among the UEs. The MAC sublayer 1710 is also responsible for HARQ operations.

In the control plane, the radio protocol architecture for the UE and eNB is substantially the same for the physical layer 1706 and the L2 layer 1708 with the exception that there is no header compression function for the control plane. The control plane also includes a radio resource control (RRC) sublayer 1716 in Layer 3 (L3 layer). The RRC sublayer 1716 is responsible for obtaining radio resources (i.e., radio bearers) and for configuring the lower layers using RRC signaling between the eNB and the UE.

Figure 18:
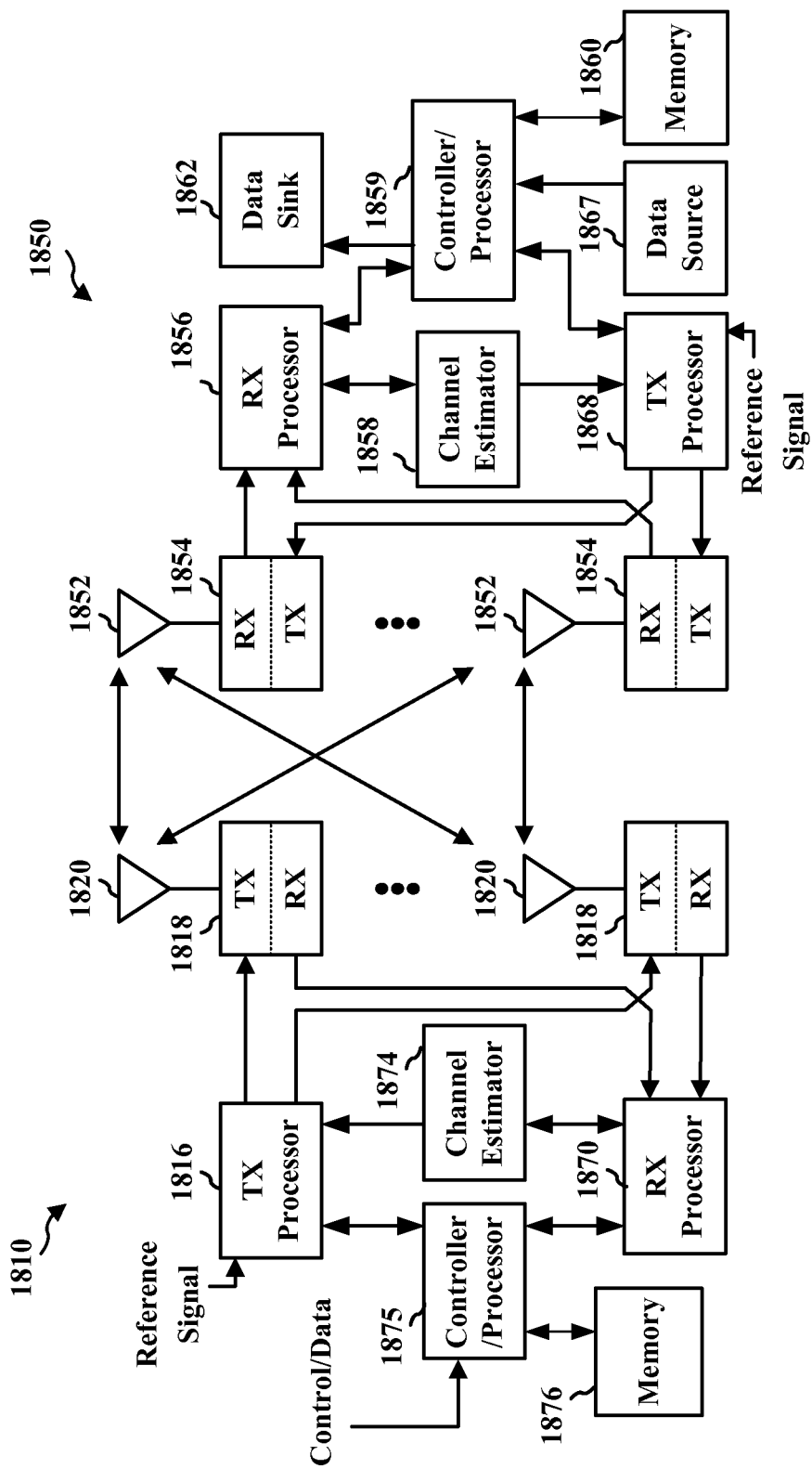
FIG. 18 is a diagram illustrating an example of an evolved Node B and user equipment in an access network in accordance with aspects described herein.

FIG. 18 is a block diagram of an eNB 1810 in communication with a UE 1850 in an access network. For example, UE 1850 can correspond to UE 902, 904, 1302, 1406, and/or eNB 1810 can correspond to eNB 1306, 1308, 1404, as described herein. In the DL, upper layer packets from the core network are provided to a controller/processor 1875. The controller/processor 1875 implements the functionality of the L2 layer. In the DL, the controller/processor 1875 provides header compression, ciphering, packet segmentation and reordering, multiplexing between logical and transport channels, and radio resource allocations to the UE 1850 based on various priority metrics. The controller/processor 1875 is also responsible for HARQ operations, retransmission of lost packets, and signaling to the UE 1850.

The transmit (TX) processor 1816 implements various signal processing functions for the L1 layer (i.e., physical layer). The signal processing functions includes coding and interleaving to facilitate forward error correction (FEC) at the UE 1850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 1874 may be used to determine the coding and modulation scheme, as well as for spatial processing. The channel estimate may be derived from a reference signal and/or channel condition feedback transmitted by the UE 1850. Each spatial stream is then provided to a different antenna 1820 via a separate transmitter 1818TX. Each transmitter 1818TX modulates an RF carrier with a respective spatial stream for transmission.

At the UE 1850, each receiver 1854RX receives a signal through its respective antenna 1852. Each receiver 1854RX recovers information modulated onto an RF carrier and provides the information to the receive (RX) processor 1856. The RX processor 1856 implements various signal processing functions of the L1 layer. The RX processor 1856 performs spatial processing on the information to recover any spatial streams destined for the UE 1850. If multiple spatial streams are destined for the UE 1850, they may be combined by the RX processor 1856 into a single OFDM symbol stream. The RX processor 1856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1810. These soft decisions may be based on channel estimates computed by the channel estimator 1858. The soft decisions are then decoded and de-interleaved to recover the data and control signals that were originally transmitted by the eNB 1810 on the physical channel. The data and control signals are then provided to the controller/processor 1859.

The controller/processor 1859 implements the L2 layer. The controller/processor can be associated with a memory 1860 that stores program codes and data. The memory 1860 may be referred to as a computer-readable medium. In the UL, the controller/processor 1859 provides demultiplexing between transport and logical channels, packet reassembly, deciphering, header decompression, control signal processing to recover upper layer packets from the core network. The upper layer packets are then provided to a data sink 1862, which represents all the protocol layers above the L2 layer. Various control signals may also be provided to the data sink 1862 for L3 processing. The controller/processor 1859 is also responsible for error detection using an acknowledgement (ACK) and/or negative acknowledgement (NACK) protocol to support HARQ operations.

In the UL, a data source 1867 is used to provide upper layer packets to the controller/processor 1859. The data source 1867 represents all protocol layers above the L2 layer. Similar to the functionality described in connection with the DL transmission by the eNB 1810, the controller/processor 1859 implements the L2 layer for the user plane and the control plane by providing header compression, ciphering, packet segmentation and reordering, and multiplexing between logical and transport channels based on radio resource allocations by the eNB 1810. The controller/processor 1859 is also responsible for HARQ operations, retransmission of lost packets, and signaling to the eNB 1810.

Channel estimates derived by a channel estimator 1858 from a reference signal or feedback transmitted by the eNB 1810 may be used by the TX processor 1868 to select the appropriate coding and modulation schemes, and to facilitate spatial processing. The spatial streams generated by the TX processor 1868 are provided to different antenna 1852 via separate transmitters 1854TX. Each transmitter 1854TX modulates an RF carrier with a respective spatial stream for transmission.

The UL transmission is processed at the eNB 1810 in a manner similar to that described in connection with the receiver function at the UE 1850. Each receiver 1818RX receives a signal through its respective antenna 1820. Each receiver 1818RX recovers information modulated onto an RF carrier and provides the information to a RX processor 1870. The RX processor 1870 may implement the L1 layer.

The controller/processor 1875 implements the L2 layer. The controller/processor 1875 can be associated with a memory 1876 that stores program codes and data. The memory 1876 may be referred to as a computer-readable medium. In the UL, the controller/processor 1875 provides demultiplexing between transport and logical channels, packet reassembly, deciphering, header decompression, control signal processing to recover upper layer packets from the UE 1850. Upper layer packets from the controller/processor 1875 may be provided to the core network. The controller/processor 1875 is also responsible for error detection using an ACK and/or NACK protocol to support HARQ operations.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for receiving from an originator wireless communications device a request to initiate a call with a target wireless communications device, and sending a call announce message that corresponds to the request to a network node. The method embodied may further include receiving from the network node an internet control message protocol (ICMP) message indicative of the node lacking a connection to a radio access network that corresponds to the target, and sending a status failure message to the originator indicative of the call failing. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for reducing time to receive a call failure indication in a wireless communications system, comprising:
    receiving, from an originating user equipment (UE), a request to initiate a call with a target UE;
    sending a call setup message that corresponds to the request to a network node;
    receiving, from the network node, an internet control message protocol (ICMP) message indicative of the network node lacking a dedicated bearer to a radio access network that corresponds to the target UE; and
    sending, based on the ICMP message, a status failure message to the originating UE indicative of the call failing.

2. The method of claim 1, wherein the network node communicates with the target UE using a default bearer, and receiving the ICMP message comprises receiving the ICMP message regardless of a status of the default bearer.

3. The method of claim 1, wherein the network node comprises a serving gateway in an evolved packet core.

4. The method of claim 1, wherein the target UE comprises a plurality of target UEs.

5. The method of claim 1, wherein the ICMP message is one from a set, the set comprising an ICMP for Internet Protocol version 4 (ICMPv4) message and an ICMP for Internet Protocol version 6 (ICMPv6) message.

6. The method of claim 1, wherein the call comprises a voice call using voice over long term evolution (VoLTE).

7. The method of claim 1, wherein the status failure message is sent on a control channel.

8. The method of claim 1, wherein the ICMP message further comprises an indication that the network node could not determine an internet protocol (IP) address for the dedicated bearer.

9. An apparatus for reducing time to receive a call failure indication in a wireless communications system, comprising:
    a call request receiving component operable for receiving, from an originating user equipment (UE), a request to initiate a call with a target UE;
    a call setup messaging component operable for sending a call setup message that corresponds to the request to a network node, and receiving, from the network node, an internet control message protocol (ICMP) message indicative of the network node lacking a dedicated bearer to a radio access network that corresponds to the target UE; and
    a call setup component operable for sending, based on the ICMP message, a status failure message to the originating UE indicative of the call failing.

10. The apparatus of claim 9, wherein the network node communicates with the target UE using a default bearer, and the call setup messaging component is operable for receiving the ICMP message regardless of a status of the default bearer.

11. The apparatus of claim 9, wherein the network node comprises a serving gateway in an evolved packet core.

12. The apparatus of claim 9, wherein the target UE comprises a plurality of target UEs.

13. The apparatus of claim 9, wherein the ICMP message is one from a set, the set comprising an ICMP for Internet Protocol version 4 (ICMPv4) message and an ICMP for Internet Protocol version 6 (ICMPv6) message.

14. The apparatus of claim 9, wherein the call comprises a voice call using voice over long term evolution (VoLTE).

15. The apparatus of claim 9, wherein the call setup component is operable for sending the status failure message on a control channel.

16. The apparatus of claim 9, wherein the ICMP message further comprises an indication that an internet protocol (IP) address for the dedicated bearer is not determined by the network node.

17. An apparatus for reducing time to receive a call failure indication in a wireless communications system, comprising:
    means for receiving, from an originating user equipment (UE), a request to initiate a call with a target UE;
    means for sending a call setup message that corresponds to the request to a network node, and receiving, from the network node, an internet control message protocol (ICMP) message indicative of the network node lacking a dedicated bearer to a radio access network that corresponds to the target UE; and means for sending, based on the ICMP message, a status failure message to the originating UE indicative of the call failing.

18. The apparatus of claim 17, wherein the network node communicates with the target UE using a default bearer, and the means for sending the call setup message is operable for receiving the ICMP message regardless of a status of the default bearer.

19. The apparatus of claim 17, wherein the ICMP message is one from a set, the set comprising an ICMP for Internet Protocol version 4 (ICMPv4) message and an ICMP for Internet Protocol version 6 (ICMPv6) message.

20. The apparatus of claim 17, wherein the call comprises a voice call using voice over long term evolution (VoLTE).

21. The apparatus of claim 17, wherein the means for sending the status failure message is operable for sending the status failure message on a control channel.

22. The apparatus of claim 17, wherein the ICMP message further comprises an indication that an internet protocol (IP) address for the dedicated bearer is not determined by the network node.

23. A computer program product, stored on a non-transitory computer readable medium, for reducing time to receive a call failure indication in a wireless communications system, comprising:
    code for causing at least one computer to receive, from an originating user equipment (UE), a request to initiate a call with a target UE;
    code for causing the at least one computer to send a call setup message that corresponds to the request to a network node;
    code for causing the at least one computer to receive, from the network node, an internet control message protocol (ICMP) message indicative of the network node lacking a dedicated bearer to a radio access network that corresponds to the target UE; and
    code for causing the at least one computer to send, based on the ICMP message, a status failure message to the originating UE indicative of the call failing.

24. The computer program product of claim 23, wherein the network node communicates with the target UE using a default bearer, and wherein the code for causing the at least one computer to receive the ICMP message is operable to receive the ICMP message regardless of a status of the default bearer.

25. The computer program product of claim 23, wherein the network node comprises a serving gateway in an evolved packet core.

26. The computer program product of claim 23, wherein the target UE comprises a plurality of target UEs.

27. The computer program product of claim 23, wherein the ICMP message is one from a set, the set comprising an ICMP for Internet Protocol version 4 (ICMPv4) message and an ICMP for Internet Protocol version 6 (ICMPv6) message.

28. The computer program product of claim 23, wherein the call comprises a voice call using voice over long term evolution (VoLTE).

29. The computer program product of claim 23, wherein the code for causing the at least one computer to send the status failure message is operable for sending the status failure message on a control channel.

30. The computer program product of claim 23, wherein the ICMP message further comprises an indication that the network node could not determine an internet protocol (IP) address for the dedicated bearer.

* * * * *